United States Patent
Wilberding et al.

(10) Patent No.: US 12,210,801 B2
(45) Date of Patent: Jan. 28, 2025

(54) MEDIA PLAYBACK SYSTEM WITH CONCURRENT VOICE ASSISTANCE

(71) Applicant: Sonos, Inc., Santa Barbara, CA (US)

(72) Inventors: Dayn Wilberding, Santa Barbara, CA (US); John Tolomei, Renton, WA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/432,733

(22) Filed: Feb. 5, 2024

(65) Prior Publication Data

US 2024/0345801 A1 Oct. 17, 2024

Related U.S. Application Data

(63) Continuation of application No. 17/656,794, filed on Mar. 28, 2022, now Pat. No. 11,893,308, which is a
(Continued)

(51) Int. Cl.
  *G10L 15/22* (2006.01)
  *G06F 3/04817* (2022.01)
  (Continued)

(52) U.S. Cl.
  CPC .......... *G06F 3/167* (2013.01); *G06F 3/04817* (2013.01); *G10L 15/08* (2013.01);
  (Continued)

(58) Field of Classification Search
  None
  See application file for complete search history.

(56) References Cited

U.S. PATENT DOCUMENTS

| | | |
|---|---|---|
| 6,704,671 B1 | 3/2004 | Umminger, III |
| 8,489,398 B1 | 7/2013 | Gruenstein |
| | (Continued) | |

FOREIGN PATENT DOCUMENTS

| | | |
|---|---|---|
| CN | 101569093 A | 10/2009 |
| CN | 104155938 A | 11/2014 |
| | (Continued) | |

OTHER PUBLICATIONS

Advisory Action mailed on Dec. 13, 2023, issued in connection with U.S. Appl. No. 18/048,034, filed Oct. 20, 2022, 4 pages.
(Continued)

*Primary Examiner* — Shreyans A Patel
(74) *Attorney, Agent, or Firm* — FORTEM IP LLP

(57) ABSTRACT

Example techniques involve invoking voice assistance for a media playback system. In some embodiments, a NMD stores in memory a set of command information comprising a listing of playback commands and associated command criteria. The NMD captures a voice input and detects inclusion, within the voice input, of one or more particular playback commands from among the playback commands in the listing. In response, the NMD selects a local voice assistant that supports (a) one or more additional playback commands relative to a cloud-based VAS and (b) fewer non-playback commands relative to the cloud-based VAS, determines, via the local voice assistant, an intent in the captured voice input, and performs a response to the determined intent. The NMD foregoes selection of the cloud-based VAS when the local voice assistant is selected.

20 Claims, 25 Drawing Sheets

Related U.S. Application Data continuation of application No. 16/834,483, filed on Mar. 30, 2020, now Pat. No. 11,288,039, which is a continuation of application No. 16/672,764, filed on Nov. 4, 2019, now Pat. No. 10,606,555, which is a continuation of application No. 15/721,141, filed on Sep. 29, 2017, now Pat. No. 10,466,962.

(51) Int. Cl.

| | | |
|---|---|---|
| *G06F 3/16* | (2006.01) | |
| *G10L 15/00* | (2013.01) | |
| *G10L 15/08* | (2006.01) | |
| *G10L 15/30* | (2013.01) | |
| *H04L 12/28* | (2006.01) | |
| *H04N 21/422* | (2011.01) | |
| *H04N 21/436* | (2011.01) | |
| *H04N 21/439* | (2011.01) | |
| G06F 3/0488 | (2022.01) | |
| G06F 9/451 | (2018.01) | |
| G10L 17/22 | (2013.01) | |

(52) U.S. Cl.
CPC ............ *G10L 15/22* (2013.01); *H04L 12/282* (2013.01); *H04N 21/42203* (2013.01); *H04N 21/43615* (2013.01); *H04N 21/4394* (2013.01); *G06F 3/0488* (2013.01); *G06F 9/453* (2018.02); *G10L 2015/088* (2013.01); *G10L 2015/223* (2013.01); *G10L 17/22* (2013.01)

(56) References Cited

U.S. PATENT DOCUMENTS

| | | | |
|---|---|---|---|
| 8,566,722 B2 | 10/2013 | Gordon et al. | |
| 8,676,273 B1 | 3/2014 | Fujisaki | |
| 8,768,712 B1 | 7/2014 | Sharifi | |
| 8,798,995 B1 | 8/2014 | Edara | |
| 8,898,063 B1 | 11/2014 | Sykes et al. | |
| 9,226,088 B2 | 12/2015 | Pandey et al. | |
| 9,491,033 B1 | 11/2016 | Soyannwo et al. | |
| 9,542,941 B1 | 1/2017 | Weksler et al. | |
| 9,632,748 B2 | 4/2017 | Faaborg et al. | |
| 9,940,930 B1 | 4/2018 | Campbell et al. | |
| 9,997,151 B1 | 6/2018 | Ayrapetian et al. | |
| 10,038,419 B1 | 7/2018 | Elliot et al. | |
| 10,127,908 B1 | 11/2018 | Deller et al. | |
| 10,152,969 B2 | 12/2018 | Reilly et al. | |
| 10,157,042 B1 | 12/2018 | Jayakumar et al. | |
| 10,204,624 B1 | 2/2019 | Knudson et al. | |
| 10,248,376 B2 | 4/2019 | Keyser-Allen et al. | |
| 10,482,899 B2 | 11/2019 | Ramprashad et al. | |
| 10,510,362 B2 | 12/2019 | Hicks et al. | |
| 10,565,999 B2 | 1/2020 | Wilberding | |
| 10,567,515 B1 | 2/2020 | Bao | |
| 10,720,173 B2 | 7/2020 | Freeman et al. | |
| 10,735,870 B2 | 8/2020 | Ballande et al. | |
| 10,746,840 B1 | 8/2020 | Barton et al. | |
| 10,789,041 B2 | 9/2020 | Kim et al. | |
| 10,847,149 B1* | 11/2020 | Mok | G10L 15/22 |
| 10,847,164 B2 | 11/2020 | Wilberding | |
| 10,871,943 B1 | 12/2020 | D'Amato | |
| 10,878,811 B2 | 12/2020 | Smith et al. | |
| 10,885,091 B1 | 1/2021 | Meng et al. | |
| 11,025,569 B2 | 6/2021 | Lind et al. | |
| 11,095,978 B2 | 8/2021 | Gigandet et al. | |
| 11,138,969 B2 | 10/2021 | D'Amato | |
| 11,140,494 B2 | 10/2021 | Pedersen et al. | |
| 11,184,969 B2 | 11/2021 | Lang | |
| 11,189,284 B2 | 11/2021 | Maeng | |
| 11,302,326 B2 | 4/2022 | Sereshki | |
| 11,354,092 B2 | 6/2022 | D'Amato | |
| 11,373,645 B1 | 6/2022 | Mathew et al. | |
| 11,475,899 B2 | 10/2022 | Lesso | |
| 11,531,520 B2 | 11/2022 | Wilberding | |
| 11,532,306 B2 | 12/2022 | Kim et al. | |
| 11,580,969 B2 | 2/2023 | Han et al. | |
| 11,646,023 B2 | 5/2023 | Smith | |
| 11,664,023 B2 | 5/2023 | Reilly | |
| 11,694,689 B2 | 7/2023 | Smith | |
| 11,700,139 B2 | 7/2023 | Drake | |
| 11,709,653 B1 | 7/2023 | Shin | |
| 11,714,600 B2 | 8/2023 | D'Amato | |
| 11,727,936 B2 | 8/2023 | Smith | |
| 11,769,505 B2 | 9/2023 | Sereshki | |
| 11,790,937 B2 | 10/2023 | Smith et al. | |
| 11,817,076 B2 | 11/2023 | Sereshki et al. | |
| 2003/0097482 A1 | 5/2003 | DeHart et al. | |
| 2004/0128135 A1* | 7/2004 | Anastasakos | G10L 15/30 |
| | | | 704/E15.047 |
| 2005/0131558 A1 | 6/2005 | Braithwaite et al. | |
| 2006/0104454 A1 | 5/2006 | Guitarte Perez et al. | |
| 2006/0161964 A1 | 7/2006 | Chung | |
| 2007/0038461 A1 | 2/2007 | Abbott et al. | |
| 2013/0171930 A1 | 7/2013 | Anand et al. | |
| 2013/0185639 A1 | 7/2013 | Lim | |
| 2013/0322634 A1 | 12/2013 | Bennett et al. | |
| 2014/0122092 A1 | 5/2014 | Goldstein | |
| 2014/0167929 A1 | 6/2014 | Shim et al. | |
| 2014/0181199 A1 | 6/2014 | Kumar et al. | |
| 2014/0253676 A1 | 9/2014 | Nagase et al. | |
| 2014/0278343 A1* | 9/2014 | Tran | G06F 40/30 |
| | | | 704/9 |
| 2014/0364089 A1 | 12/2014 | Lienhart et al. | |
| 2015/0073807 A1* | 3/2015 | Kumar | G10L 15/30 |
| | | | 704/273 |
| 2015/0112689 A1 | 4/2015 | Nandy et al. | |
| 2015/0154954 A1 | 6/2015 | Sharifi | |
| 2015/0215382 A1 | 7/2015 | Arora et al. | |
| 2015/0248885 A1 | 9/2015 | Koulomzin | |
| 2015/0279351 A1 | 10/2015 | Nguyen et al. | |
| 2015/0356968 A1 | 12/2015 | Rice et al. | |
| 2016/0014536 A1 | 1/2016 | Sheen | |
| 2016/0034448 A1* | 2/2016 | Tran | G06F 40/58 |
| | | | 704/277 |
| 2016/0078864 A1 | 3/2016 | Palanisamy et al. | |
| 2016/0118048 A1* | 4/2016 | Heide | G10L 15/22 |
| | | | 704/275 |
| 2016/0335485 A1 | 11/2016 | Kim | |
| 2016/0379635 A1 | 12/2016 | Page | |
| 2017/0287496 A1 | 10/2017 | Heitkamp et al. | |
| 2017/0332035 A1 | 11/2017 | Shah et al. | |
| 2017/0337932 A1 | 11/2017 | Iyengar et al. | |
| 2018/0033429 A1* | 2/2018 | Makke | G06F 3/167 |
| 2018/0040324 A1 | 2/2018 | Wilberding | |
| 2018/0120947 A1 | 5/2018 | Wells et al. | |
| 2018/0270575 A1 | 9/2018 | Akutagawa | |
| 2018/0330589 A1 | 11/2018 | Horling | |
| 2018/0352014 A1 | 12/2018 | Alsina et al. | |
| 2019/0044745 A1 | 2/2019 | Knudson et al. | |
| 2019/0051299 A1 | 2/2019 | Ossowski et al. | |
| 2019/0066680 A1 | 2/2019 | Woo et al. | |
| 2019/0147860 A1 | 5/2019 | Chen et al. | |
| 2019/0259408 A1 | 8/2019 | Freeman et al. | |
| 2019/0281387 A1 | 9/2019 | Woo et al. | |
| 2019/0371329 A1 | 12/2019 | D'Souza et al. | |
| 2020/0043494 A1 | 2/2020 | Maeng | |
| 2020/0066279 A1 | 2/2020 | Kang et al. | |
| 2020/0075018 A1 | 3/2020 | Chen | |
| 2020/0089469 A1 | 3/2020 | Wilberding et al. | |
| 2020/0167597 A1 | 5/2020 | Nguyen et al. | |
| 2020/0265842 A1 | 8/2020 | Singh | |
| 2020/0364026 A1 | 11/2020 | Lee et al. | |
| 2021/0029452 A1 | 1/2021 | Tsoi et al. | |
| 2021/0134280 A1 | 5/2021 | Kurtz | |
| 2021/0157542 A1 | 5/2021 | De Assis et al. | |
| 2021/0239831 A1 | 8/2021 | Shin et al. | |
| 2021/0249004 A1 | 8/2021 | Smith | |
| 2021/0287670 A1 | 9/2021 | Regan et al. | |
| 2021/0358481 A1 | 11/2021 | D'Amato et al. | |
| 2022/0035514 A1 | 2/2022 | Shin et al. | |
| 2023/0019595 A1 | 1/2023 | Smith | |
| 2023/0215433 A1 | 7/2023 | Myers et al. | |

(56) References Cited

U.S. PATENT DOCUMENTS

| | | | |
|---|---|---|---|
| 2023/0237998 A1 | | 7/2023 | Smith et al. |
| 2023/0274738 A1 | | 8/2023 | Smith et al. |
| 2023/0382349 A1 | | 11/2023 | Ham |

FOREIGN PATENT DOCUMENTS

| | | | | | |
|---|---|---|---|---|---|
| CN | 104581510 A | | 4/2015 | | |
| CN | 105101083 A | | 11/2015 | | |
| CN | 107465974 A | * | 12/2017 | ............ | G01H 17/00 |
| EP | 3142107 A1 | * | 3/2017 | ........... | G10L 15/063 |
| JP | 2004096520 A | | 3/2004 | | |
| JP | 2016009193 A | * | 1/2016 | ............ | G10L 15/02 |
| JP | 2019109510 A | | 7/2019 | | |
| KR | 101284134 B1 | | 7/2013 | | |
| WO | 9731437 A1 | | 8/1997 | | |
| WO | 2016014686 | | 1/2016 | | |
| WO | 2018064362 A1 | | 4/2018 | | |
| WO | 2020061439 A1 | | 3/2020 | | |
| WO | 2020068795 A1 | | 4/2020 | | |
| WO | 2020132298 A1 | | 6/2020 | | |

OTHER PUBLICATIONS

Advisory Action mailed on Feb. 26, 2024, issued in connection with U.S. Appl. No. 17/532,744, filed Nov. 22, 2021, 4 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Oct. 31, 2023, issued in connection with Australian Application No. 2023203687, 2 pages.
Canadian Patent Office, Canadian Examination Report mailed on Oct. 12, 2023, issued in connection with Canadian Application No. 3084279, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Jan. 3, 2024, issued in connection with Canadian Application No. 3123601, 3 pages.
Canadian Patent Office, Canadian Examination Report mailed on May 8, 2024, issued in connection with Canadian Application No. 3146914, 5 pages.
Chinese Patent Office, First Office Action and Translation mailed on Apr. 23, 2024, issued in connection with Chinese Application No. 202110542908.5, 10 pages.
Chinese Patent Office, First Office Action and Translation mailed on Sep. 6, 2023, issued in connection with Chinese Application No. 202010179593.8, 14 pages.
Chinese Patent Office, Second Office Action mailed on May 30, 2023, issued in connection with Chinese Application No. 201980070006.7, 9 pages.
European Patent Office, European EPC Article 94.3 mailed on Jun. 5, 2023, issued in connection with European Application No. 20710649.3, 8 pages.
European Patent Office, European EPC Article 94.3 mailed on Jan. 10, 2024, issued in connection with European Application No. 20757152.2, 6 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on Jan. 24, 2024, issued in connection with European Application No. 21180778.9, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2023, issued in connection with European Application No. 19731415.6, 9 pages.
European Patent Office, European EPC Article 94.3 mailed on Apr. 29, 2024, issued in connection with European Application No. 21195031.6, 4 pages.
European Patent Office, European EPC Article 94.3 mailed on Mar. 29, 2023, issued in connection with European Application No. 22182193.7, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Jun. 4, 2024, issued in connection with European Application No. 21180778.9, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Jan. 2, 2024, issued in connection with European Application No. 23188226.7, 10 pages.
European Patent Office, European Search Report mailed on Feb. 2, 2024, issued in connection with European Application No. 23200723.7, 5 pages.
European Patent Office, European Search Report mailed on Sep. 21, 2023, issued in connection with European Application No. 23172783.5, 8 pages.
Final Office Action mailed on May 17, 2023, issued in connection with U.S. Appl. No. 16/168,389, filed Oct. 23, 2018, 44 pages.
Final Office Action mailed on Aug. 22, 2023, issued in connection with U.S. Appl. No. 18/061,570, filed Dec. 5, 2022, 12 pages.
Final Office Action mailed on Aug. 25, 2023, issued in connection with U.S. Appl. No. 16/989,350, filed Aug. 10, 2020, 21 pages.
Final Office Action mailed on Feb. 27, 2024, issued in connection with U.S. Appl. No. 17/340,590, filed Jun. 7, 2021, 28 pages.
Final Office Action mailed on Sep. 27, 2023, issued in connection with U.S. Appl. No. 18/048,034, filed Oct. 20, 2022, 9 pages.
Final Office Action mailed on Oct. 6, 2023, issued in connection with U.S. Appl. No. 17/532,744, filed Nov. 22, 2021, 21 pages.
Final Office Action mailed on Aug. 9, 2023, issued in connection with U.S. Appl. No. 17/493,430, filed Oct. 4, 2021, 19 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.

(56) References Cited

OTHER PUBLICATIONS

*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on May 23, 2023, issued in connection with Japanese Patent Application No. 2021-163622, 13 pages.
Japanese Patent Office, Notice of Reasons for Refusal and Translation mailed on Aug. 8, 2023, issued in connection with Japanese Patent Application No. 2022-101346, 6 pages.
Korean Patent Office, Korean Examination Report and Translation mailed on Jul. 19, 2023, issued in connection with Korean Application No. 10-2022-7024007, 9 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Non-Final Office Action mailed on Feb. 1, 2024, issued in connection with U.S. Appl. No. 18/313,013, filed May 5, 2023, 47 pages.
Non-Final Office Action mailed on May 1, 2024, issued in connection with U.S. Appl. No. 17/650,441, filed Feb. 9, 2022, 12 pages.
Non-Final Office Action mailed on Aug. 10, 2023, issued in connection with U.S. Appl. No. 18/070,024, filed Nov. 28, 2022, 4 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Mar. 13, 2024, issued in connection with U.S. Appl. No. 18/309,939, filed May 1, 2023, 15 pages.
Non-Final Office Action mailed on Sep. 14, 2023, issued in connection with U.S. Appl. No. 17/528,843, filed Nov. 17, 2021, 20 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Mar. 18, 2024, issued in connection with U.S. Appl. No. 17/532,744, filed Nov. 22, 2021, 20 pages.
Non-Final Office Action mailed on Jan. 19, 2024, issued in connection with U.S. Appl. No. 18/331,580, filed Jun. 8, 2023, 11 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on May 20, 2024, issued in connection with U.S. Appl. No. 18/600,044, filed Mar. 8, 2024, 24 pages.
Non-Final Office Action mailed on Nov. 21, 2023, issued in connection with U.S. Appl. No. 18/088,976, filed Dec. 27, 2022, 9 pages.
Non-Final Office Action mailed on Jun. 23, 2023, issued in connection with U.S. Appl. No. 18/048,945, filed Oct. 24, 2022, 10 pages.
Non-Final Office Action mailed on Oct. 23, 2023, issued in connection with U.S. Appl. No. 17/932,715, filed Sep. 16, 2022, 14 pages.
Non-Final Office Action mailed on Apr. 24, 2024, issued in connection with U.S. Appl. No. 18/461,430, filed Sep. 5, 2023, 22 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Apr. 26, 2024, issued in connection with U.S. Appl. No. 18/310,025, filed May 1, 2023, 9 pages.
Non-Final Office Action mailed on Jan. 26, 2024, issued in connection with U.S. Appl. No. 17/450,925, filed Oct. 14, 2021, 9 pages.
Non-Final Office Action mailed on Aug. 28, 2023, issued in connection with U.S. Appl. No. 17/722,661, filed Apr. 18, 2022, 16 pages.
Non-Final Office Action mailed on Mar. 28, 2024, issued in connection with U.S. Appl. No. 18/192,452, filed Mar. 29, 2023, 7 pages.
Non-Final Office Action mailed on Feb. 29, 2024, issued in connection with U.S. Appl. No. 18/449,244, filed Aug. 14, 2023, 15 pages.
Non-Final Office Action mailed on Jul. 3, 2023, issued in connection with U.S. Appl. No. 17/135,173, filed Dec. 28, 2020, 22 pages.
Non-Final Office Action mailed on May 30, 2024, issued in connection with U.S. Appl. No. 18/503,971, filed Nov. 7, 2023, 8 pages.
Non-Final Office Action mailed on Jul. 5, 2023, issued in connection with U.S. Appl. No. 18/061,579, filed Dec. 5, 2022, 11 pages.
Non-Final Office Action mailed on Oct. 6, 2023, issued in connection with U.S. Appl. No. 17/222,950, filed Apr. 5, 2021, 9 pages.
Non-Final Office Action mailed on Jun. 7, 2023, issued in connection with U.S. Appl. No. 16/179,779, filed Nov. 2, 2018, 29 pages.
Non-Final Office Action mailed on Sep. 7, 2023, issued in connection with U.S. Appl. No. 17/340,590, filed Jun. 7, 2021, 18 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed on Jun. 9, 2023, issued in connection with U.S. Appl. No. 17/532,674, filed Nov. 22, 2021, 13 pages.
Notice of Allowance mailed on Jul. 10, 2023, issued in connection with U.S. Appl. No. 17/315,599, filed May 10, 2021, 2 pages.
Notice of Allowance mailed on Aug. 11, 2023, issued in connection with U.S. Appl. No. 17/878,649, filed Aug. 1, 2022, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.

(56) References Cited

OTHER PUBLICATIONS

Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Mar. 13, 2024, issued in connection with U.S. Appl. No. 18/449,254, filed Aug. 14, 2023, 10 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Sep. 14, 2023, issued in connection with U.S. Appl. No. 18/061,579, filed Dec. 5, 2022, 7 pages.
Notice of Allowance mailed on Dec. 15, 2023, issued in connection with U.S. Appl. No. 18/157,937, filed Jan. 23, 2023, 8 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Aug. 16, 2023, issued in connection with U.S. Appl. No. 17/536,572, filed Nov. 29, 2021, 7 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Oct. 2, 2023, issued in connection with U.S. Appl. No. 17/810,533, filed Jul. 1, 2022, 8 pages.
Notice of Allowance mailed on Aug. 21, 2023, issued in connection with U.S. Appl. No. 17/548,921, filed Dec. 13, 2021, 10 pages.
Notice of Allowance mailed on Jul. 21, 2023, issued in connection with U.S. Appl. No. 17/986,241, filed Nov. 14, 2022, 12 pages.
Notice of Allowance mailed on May 24, 2024, issued in connection with U.S. Appl. No. 18/154,228, filed Jan. 13, 2023, 8 pages.
Notice of Allowance mailed on Nov. 24, 2023, issued in connection with U.S. Appl. No. 18/070,024, filed Nov. 28, 2022, 7 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2024, issued in connection with U.S. Appl. No. 18/316,400, filed May 12, 2023, 8 pages.
Notice of Allowance mailed on Sep. 29, 2023, issued in connection with U.S. Appl. No. 16/168,389, filed Oct. 23, 2018, 11 pages.
Notice of Allowance mailed on May 3, 2024, issued in connection with U.S. Appl. No. 18/331,580, filed Jun. 8, 2023, 7 pages.
Notice of Allowance mailed on Jun. 30, 2023, issued in connection with U.S. Appl. No. 17/303,001, filed May 18, 2021, 8 pages.
Notice of Allowance mailed on Aug. 31, 2023, issued in connection with U.S. Appl. No. 18/145,520, filed Dec. 22, 2022, 2 pages.
Notice of Allowance mailed on Aug. 4, 2023, issued in connection with U.S. Appl. No. 18/145,520, filed Dec. 22, 2022, 10 pages.
Notice of Allowance mailed on Jun. 7, 2024, issued in connection with U.S. Appl. No. 18/316,434, filed May 12, 2023, 9 pages.
Notice of Allowance mailed on Mar. 8, 2024, issued in connection with U.S. Appl. No. 17/135,173, filed Dec. 28, 2020, 9 pages.
Notice of Allowance mailed on Nov. 8, 2023, issued in connection with U.S. Appl. No. 18/066,093, filed Dec. 14, 2022, 11 pages.

\* cited by examiner

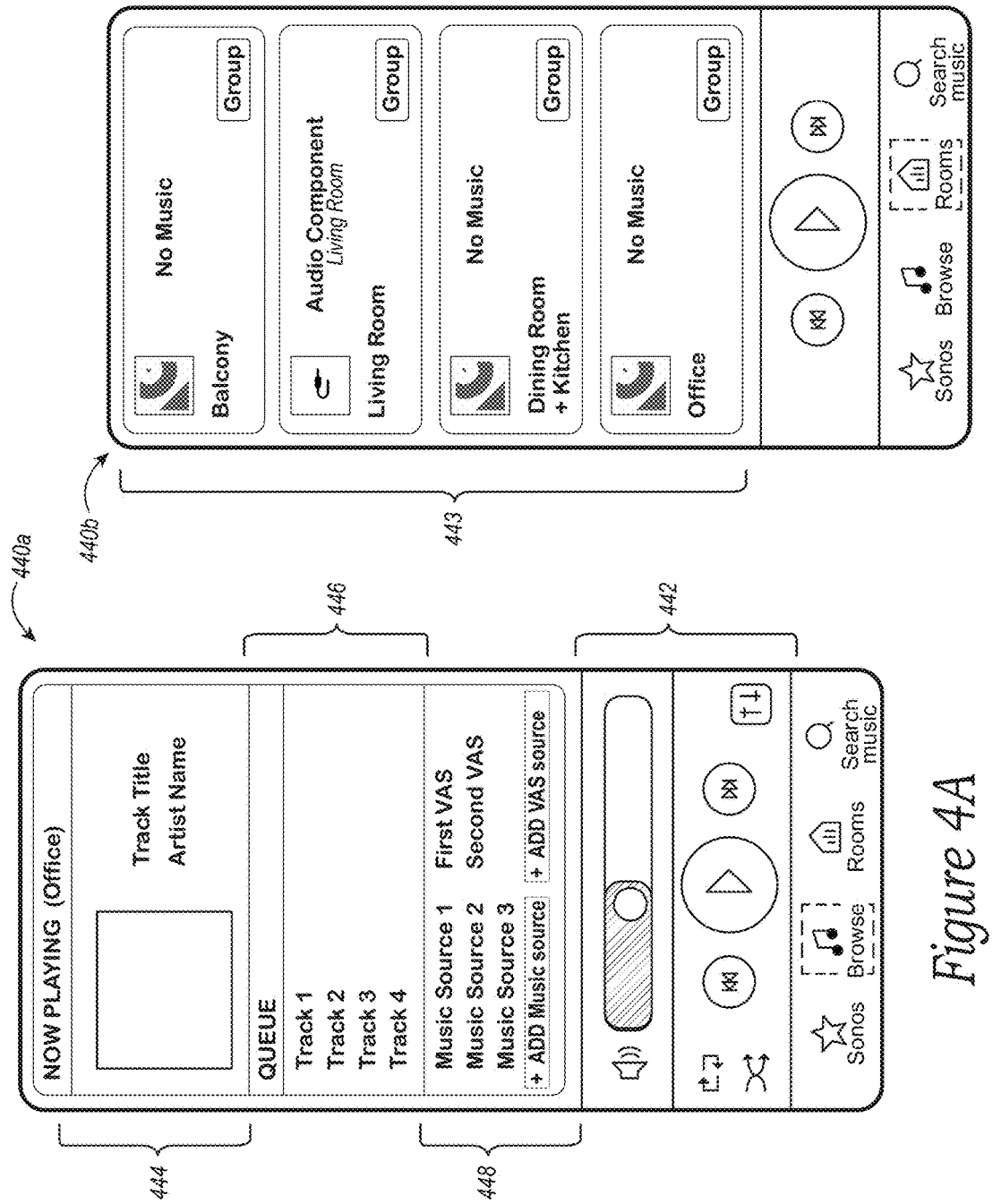

| PLAYBACK - Initiation | |
|---|---|
| COMMAND | COGNATES |
| play | turn on |
| | play some/my music |
| | let's rock/jam |
| | break it down |
| | bust it |
| | kick it |
| play (content) | play (content) |
| | play me (content) |
| | please play (content) |
| | can you/will you play (content) |
| | I'd love to hear (content) |
| | can I hear some (content)? |
| | put on some (content) |
| | switch (content) |
| play (content) for mood | play (content) for (mood) |
| play (content) for activity | play (content) for (activity) |
| play (content) ... service target | play (content) ... service target |
| | play (content) on Spotify |
| play radio | play/turn on/put on the radio |
| | find a station that's playing music |
| play news | play the news |
| | play my news |
| find/create station for (artist/song) | find/create station for (artist/song) |
| playback steering | play artists/song like x |
| | play more x |
| | play more/less like x |
| | play something more (descriptive) |
| playback multi-turn | |

⋮

| CONTROL |
|---|

⋮

| TARGETING |
|---|

⋮

| INQUIRY |
|---|

*Figure 9A*

| PLAYBACK - Initiation | |
|---|---|

⋮

CONTROL

Transport {

| COMMAND | COGNATES |
|---|---|
| pause | pause |
| stop | stop, shut up, (turn) off |
| next | next/skip |
| | next song/track/chapter/episode |
| previous | previous/back |
| | skip back/go back |
| restart track | start over/repeat this song |
| | start this song/track over |
| | play this from the top/beginning |
| repeat | repeat |
| | play that again (track or container) |
| shuffle on/off | shuffle/unshuffle/randomize |
| Go to specific location or track | skip to halfway through this song |
| | go to last minute of this song |
| Resume | resume/continue |

⋮

| volume up/down | louder/quieter |
|---|---|
| | turn it up/down |
| tune volume a lot/little | turen it up/down a lot/little |
| | a lot softer/quieter/louder |
| | volume 50 percent/volume half |
| | volume 5 |
| | mute |
| Source | turn on/off |
| | turn on/off quiet mode |
| | enhance speech |
| | switch to line in |
| | switch/change to music/TV |

⋮

TARGETING

⋮

INQUIRY

*Figure 9B*

| PLAYBACK - Initiation |
|---|
| ⋮ |

| CONTROL |
|---|
| ⋮ |

| TARGETING - Zone/Group/Device ||
| COMMANDS | COGNATES |
|---|---|
| device grouping | *group/join/combine (devices)* |
| | *group/join/combine (groups)* |
| | *ungroup (devices)* |
| | *ungroup (groups)* |
| | *add/drop (devices/groups)* |
| | *turn off* |
| calibrate | *calibrate (devices/groups)* |
| | *trueplay (devices/groups)* |
| pairing/consolidating | *pair/bond (devices)* |
| | *separate (devices/groups)* |
| | *break apart (devices/groups)* |
| group volume | *increase/decrease (group volume)* |
| | *mute/unmute (device(s)) in (group)* |
| | *raise/lower volume of (device(s))* |
| group head | *select (device) as (group) head* |
| | *make (device) (group) head* |
| calibrate multi-turn commands<br>pairing multi-turn commands<br>consolidating multi-turn commands | |

⋮

| TARGETING |
|---|
| ⋮ |

| INQUIRY |
|---|

*Figure 9C*

MEDIA PLAYBACK SYSTEM WITH CONCURRENT VOICE ASSISTANCE

CROSS REFERENCE TO RELATED APPLICATIONS

This application is a continuation of U.S. patent application Ser. No. 17/656,794, filed Mar. 28, 2022, now U.S. Pat. No. 11,893,308, which is a continuation of U.S. patent application Ser. No. 16/834,483, filed Mar. 30, 2020, now U.S. Pat. No. 11,288,039, which is a continuation of U.S. patent application Ser. No. 16/672,764, filed Nov. 4, 2019, now U.S. Pat. No. 10,606,555, which is a continuation of U.S. patent application Ser. No. 15/721,141, filed Sep. 29, 2017, now U.S. Pat. No. 10,466,962, which are incorporated herein by reference in their entireties.

FIELD OF THE DISCLOSURE

The disclosure is related to consumer goods and, more particularly, to methods, systems, products, features, services, and other elements directed to voice control of media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 4A and 4B are controller interfaces in accordance with aspects of the disclosure;

FIGS. 9A, 9B, and 9C are tables with example voice input commands and associated information in accordance with aspects of the disclosure;

Figure 1:
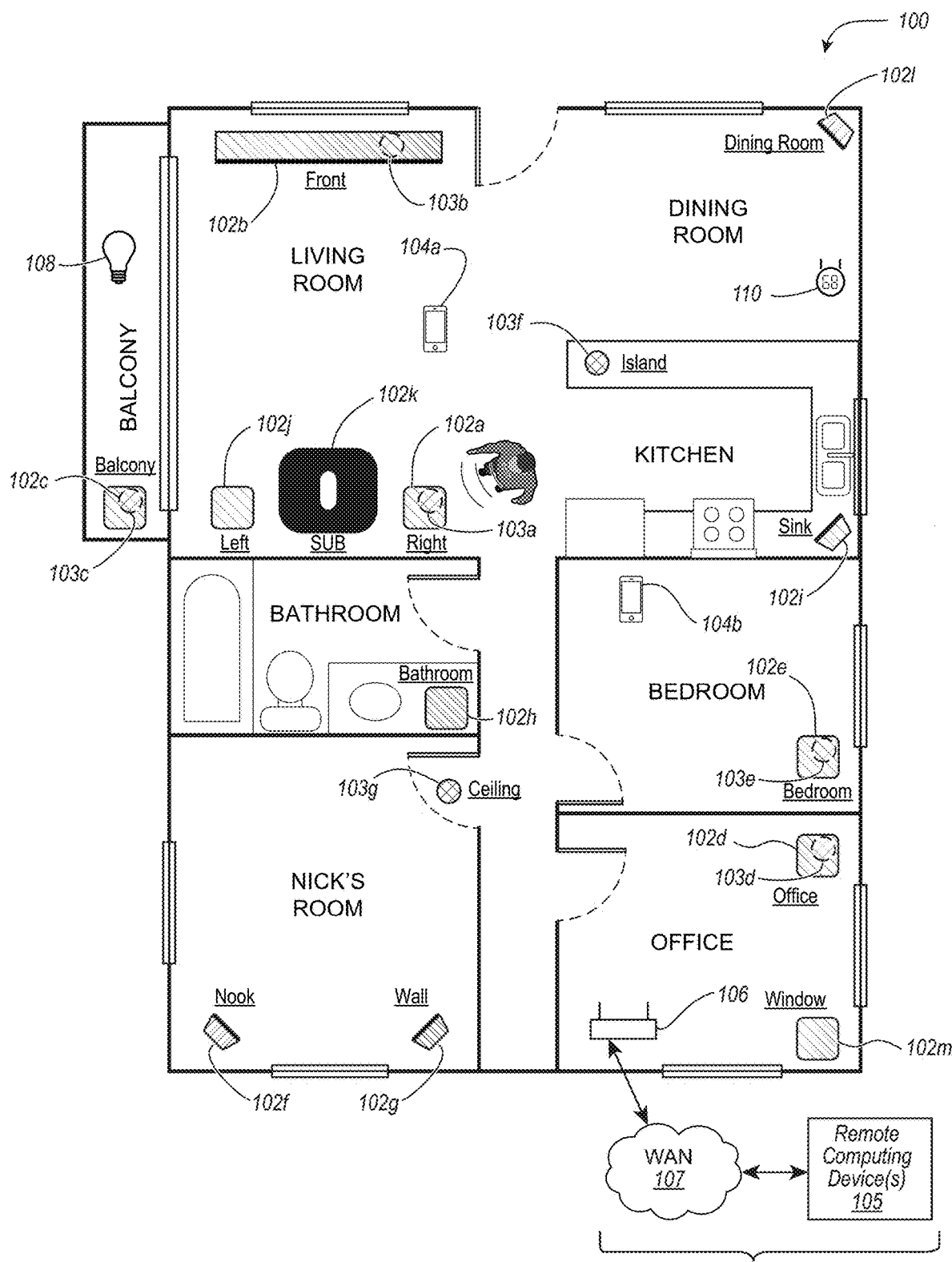
FIG. 1 shows a media playback system in which certain embodiments may be practiced.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 107 is first introduced and discussed with reference to FIG. 1.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices may be used to control smart home devices. A network microphone device will typically include a microphone for receiving voice inputs. The network microphone device can forward voice inputs to a voice assistant service (VAS). A traditional VAS may be a remote service implemented by cloud servers to process voice inputs. A VAS may process a voice input to determine an intent of the voice input. Based on the response, the network microphone device may cause one or more smart devices to perform an action. For example, the network microphone device may instruct an illumination device to turn on/off based on the response to the instruction from the VAS.

A voice input detected by a network microphone device will typically include a wake word followed by an utterance containing a user request. The wake word is typically a predetermined word or phrase used to "wake up" and invoke the VAS for interpreting the intent of the voice input. For instance, in querying the AMAZON® VAS, a user might speak the wake word "Alexa." Other examples include "Ok, Google" for invoking the GOOGLE® VAS and "Hey, Siri" for invoking the APPLE® VAS, or "Hey, Sonos" for a VAS offered by SONOS®.

A network microphone device listens for a user request or command accompanying a wake word in the voice input. In some instances, the user request may include a command to control a third-party device, such as a thermostat (e.g., NEST® thermostat), an illumination device (e.g., a PHILIPS HUE® lighting device), or a media playback device (e.g., a Sonos® playback device). For example, a user might speak the wake word "Alexa" followed by the utterance "set the thermostat to 68 degrees" to set the temperature in a home using the Amazon® VAS. A user might speak the same wake word followed by the utterance "turn on the living room" to turn on illumination devices in a living room area of the home. The user may similarly speak a wake word followed by a request to play a particular song, an album, or a playlist of music on a playback device in the home.

A VAS may employ natural language understanding (NLU) systems to process voice inputs. NLU systems typically require multiple remote servers that are programmed to detect the underlying intent of a given voice input. For example, the servers may maintain a lexicon of language; parsers; grammar and semantic rules; and associated processing algorithms to determine the user's intent.

One challenge encountered by traditional VASes is that NLU processing is computationally intensive. For example, voice processing algorithms need to be regularly updated for handling nuances in parlance, sentence structure, pronunciation, and other speech characteristics. As such, providers of VASes must maintain and continually develop processing algorithms and deploy an increasing number of resources, such as additional cloud servers, to handle the myriad voice inputs that are received from users all over the world.

A related challenge is that voice control of certain smart devices may require relatively complex voice processing algorithms, which can further tax VAS resources. For example, to switch on a set of illumination devices in a living room, one user may prefer to say, "flip on the lights," while another user may prefer to say, "turn on the living room." Both users have the same underlying intent to turn on illumination devices, but the structure of the phrases, including the verbs, are different, not to mention that the latter phrase identifies devices in the living room, while the former does not. To address these issues, VASes must dedicate further resources to decipher user intent, particularly when controlling smart devices that require complex voice processing resources and algorithms, such as algorithms for distinguishing between subtle yet meaningful variations in command structure and related syntax.

As consumer demand for smart devices grows and these devices become more variegated, certain VAS providers may be hard-pressed to keep up with developments. In some cases, VASes may have limited system resources, which diminishes a VAS's ability to successfully respond to inbound voice inputs. For instance, in the example above, a VAS may have the ability to process the voice utterance to "turn on the lights," but may lack the ability to process a voice utterance to "flip on the lights" because the service may use algorithms that cannot recognize the intent behind the more idiomatic phraseology of the latter. In such a case, the user may have to rephrase the original request with further qualifying information, such as by saying "turn on the lights in the living room." Alternately, the VAS may inform the user that it cannot process such a request, or the VAS may simply ignore the request altogether. In any of these cases, users may become dissatisfied due to a poor voice-control experience.

In the case of media playback systems, such as multi-zone playback systems, a conventional VAS may be particularly limited. For example, a traditional VAS may only support voice control for rudimentary playback or require the user to use specific and stilted phraseology to interact with a device rather than natural dialogue. Further, a traditional VAS may not support multi-zone playback or other features that a user wishes to control, such as device grouping, multi-room volume, equalization parameters, and/or audio content for a given playback scenario. Controlling such functions may require significantly more resources beyond those needed for rudimentary playback.

Media playback systems described herein can address these and other limitations of traditional VASes. For example, in some embodiments, a media playback is configured to select a first VAS (e.g., an enhanced VAS) over a second VAS (e.g., a traditional VAS) to process voice inputs. In such a case, the media playback system may intervene by selecting the first VAS over the second to process certain voice inputs, such as voice inputs for controlling relatively advanced and other features of a media playback system. In one aspect, the first VAS may enhance voice control relative to voice control provided by the second VAS alone. In some embodiments, at least some voice inputs targeting a media playback system may not be invokable via the second VAS. In these and other embodiments, at least some voice inputs may be invokable via the second VAS, but it may be preferable for the first VAS to process certain voice inputs. For example, the first VAS may process certain requests more reliably and accurately than the second VAS. In some embodiments, the second VAS may be a default VAS to which certain types of voice inputs are typically sent. For example, in some embodiments, a traditional VAS may be better suited to handle requests involving generic Internet queries, such as a voice input that says, "tell me today's weather." In related embodiments, a user may use the same wake work (e.g., "Hey Samantha") when invoking either of the first and second VASes. In one aspect, may be unaware that a selection of one VAS over another is occurring behind the scenes when uttering voice input. In one embodiments, the wake work may be a wake word associated with a traditional VAS, such as AMAZON's ALEXA®.

In one embodiment, a media playback system may include a network microphone device configured to capture a voice input. The media playback system is configured to (i) capture a voice input via the at least one microphone device, (ii) detect inclusion of one or more of the commands within the captured voice input, (iii) determine that the one or more commands meets corresponding command criteria in a set of command information, and (iv) in response to the determination, (a) select the first (VAS) and forego selection of a second VAS, (b) send the voice input to the first VAS, and (c) after sending the voice input, process a response to the voice input from the first VAS.

In some embodiments, the network microphone device is configured to store a set of command information in local memory of the network microphone device. In some embodiments, the set of command information may be stored on another network device, such as another network microphone device or playback device on a local area network (LAN). In some embodiments, the set of command information may be stored across multiple network devices on a LAN and/or remotely. In various embodiments described below, a set of command information may be used in a process to determine if the media playback system should select the first VAS and forego selection of the second VAS.

In some embodiments, the network microphone device may store a listing of predetermined commands and command criteria associated with the commands. The commands may include, for example, playback, control, and zone targeting commands. The command criteria can include, for example, predetermined keywords associated with specific commands. A combination of keywords in a voice input may include, for example, the utterance of the name of first room in a home (e.g., the living room) and the utterance of the name of a second room in the home (e.g., the bedroom). When a user speaks a voice input that includes a specific command (such as a command to play music) in combination with the keywords, the media playback system selects and invokes the first VAS for processing the voice input.

In some embodiments, the keywords may be developed by training and adaptive learning algorithms. In certain embodiments, such keywords may be determined on the fly while processing a voice input that includes the keywords. In such cases, the keywords are not predetermined before processing the voice input, but may nevertheless enable the first VAS to be invoked based on the command. In related embodiments, the keywords may be associated with certain cognates of the command having the same intent.

In some embodiments, invoking the first VAS may include sending the voice input to one or more remote servers of the first VAS. In the example above, the first VAS may determine the user's intent to play in the first and second rooms and respond by directing the media playback system to play the desired audio in the first and second rooms. The first VAS may also instruct the media playback system to form a group that comprises the first and second rooms.

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide a first VAS 160 for the media playback system 100.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103a of the playback device 102a in the Living Room may capture the voice input of a user in its vicinity. In some instances, other network microphone devices (e.g., the NMDs 103b and 103f) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that may not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback and Network Microphone Devices

Figure 2A:
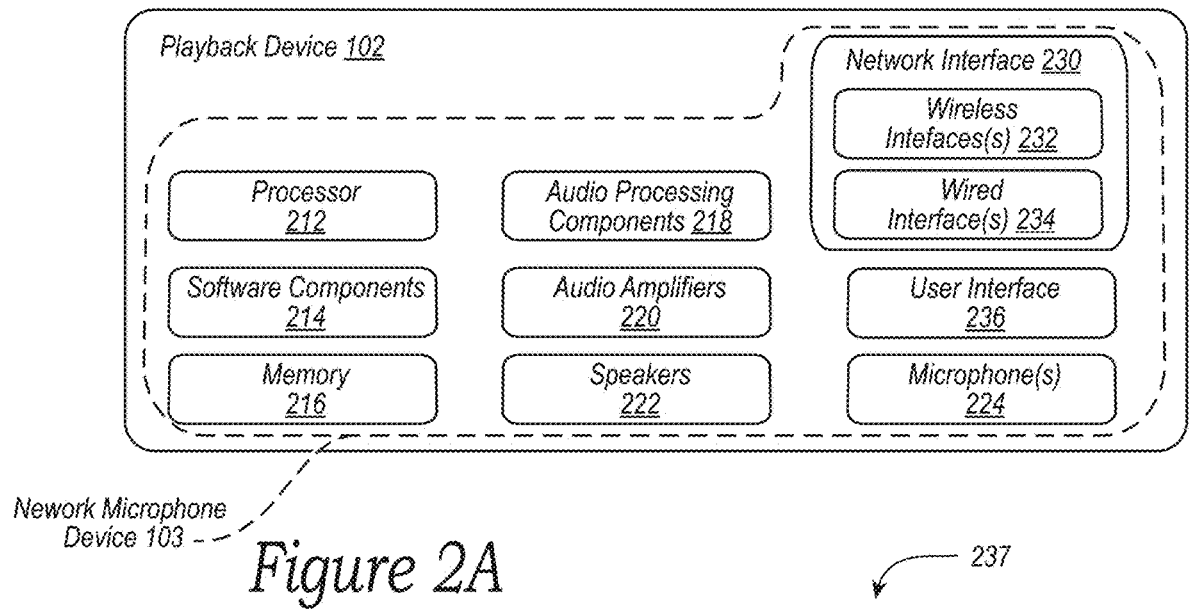
FIG. 2A is a functional block diagram of an example playback device.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

Figure 2B:
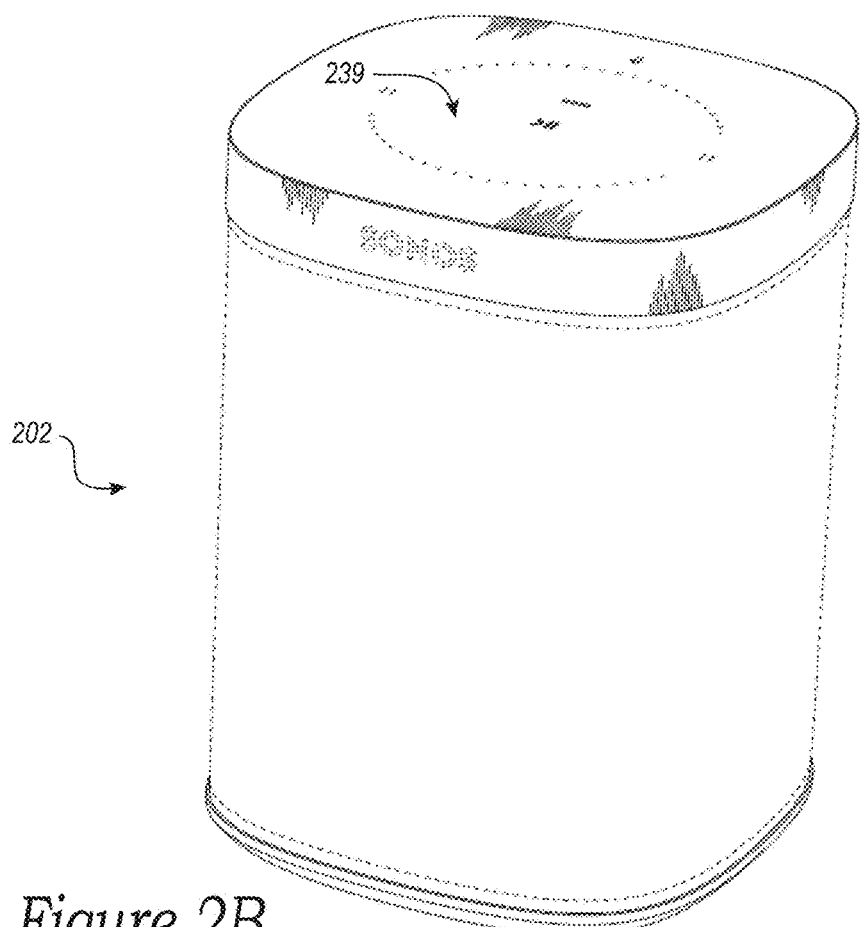
FIG. 2B is a isometric diagram of an example playback device that includes a network microphone device.

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a control area 237 at the top of the device for enabling/disabling microphone(s). The control area 237 is adjacent another area 239 at the top of the device for controlling playback.

By way of illustration, SONOS, Inc. presently offers (or has offered) for sale certain playback devices including a "PLAY: 1," "PLAY: 3," "PLAY: 5," "PLAYBAR," "CONNECT: AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2A or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3A:
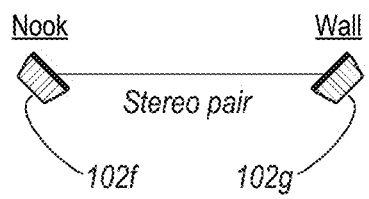
FIGS. 3A, 3B, 3C, 3D, and 3E are diagrams showing example zones and zone groups in accordance with aspects of the disclosure.
Figure 3B:
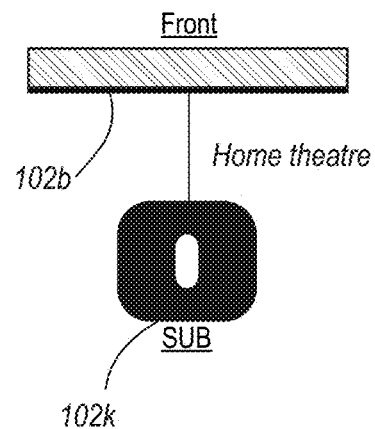
Figure 3C:
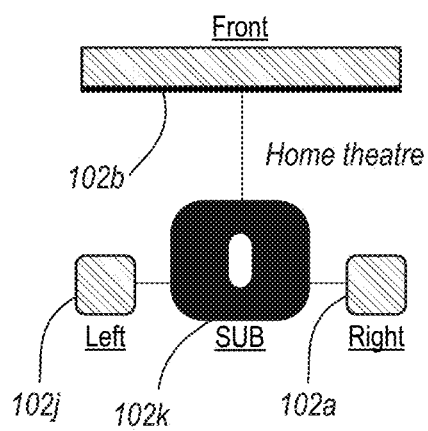
Figure 3D:
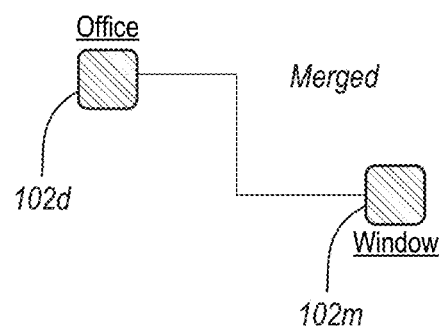
Figure 3E:
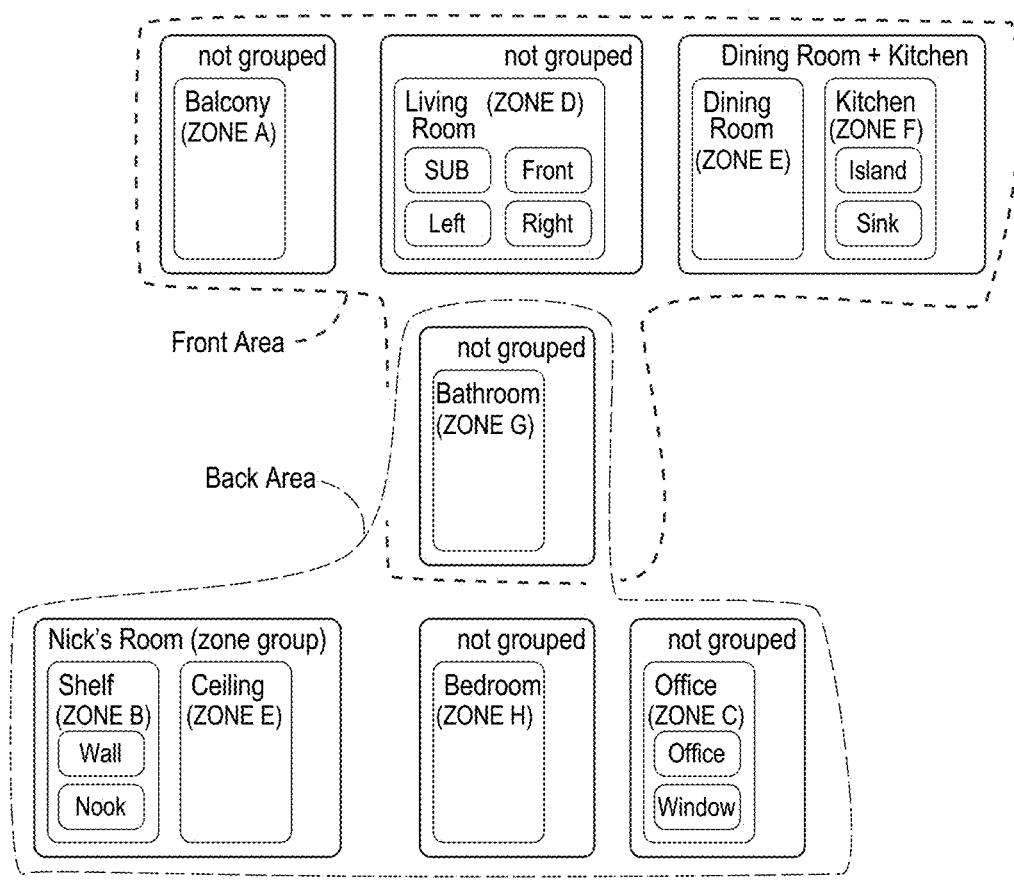

FIGS. 3A-3E show example configurations of playback devices in zones and zone groups. Referring first to FIG. 3E, in one example, a single playback device may belong to a zone. For example, the playback device 102c in the Balcony may belong to Zone A. In some implementations described below, multiple playback devices may be "bonded" to form a "bonded pair" which together form a single zone. For example, the playback device 102f named Nook in FIG. 1 may be bonded to the playback device 102g named Wall to form Zone B. Bonded playback devices may have different playback responsibilities (e.g., channel responsibilities). In another implementation described below, multiple playback devices may be merged to form a single zone. For example, the playback device 102d named Office may be merged with the playback device 102m named Window to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the media playback system 100 may be provided for control as a single user interface (UI) entity. For example, Zone A may be provided as a single entity named Balcony. Zone C may be provided as a single entity named Office. Zone B may be provided as a single entity named Shelf.

In various embodiments, a zone may take on the name of one of the playback device(s) belonging to the zone. For example, Zone C may take on the name of the Office device 102d (as shown). In another example, Zone C may take on the name of the Window device 102m. In a further example, Zone C may take on a name that is some combination of the Office device 102d and Window device 102 m. The name that is chosen may be selected by user. In some embodiments, a zone may be given a name that is different than the device(s) belonging to the zone. For example, Zone B is named Shelf but none of the devices in Zone B have this name.

Playback devices that are bonded may have different playback responsibilities, such as responsibilities for certain audio channels. For example, as shown in FIG. 3A, the Nook and Wall devices 102f and 102g may be bonded so as to produce or enhance a stereo effect of audio content. In this example, the Nook playback device 102f may be configured to play a left channel audio component, while the Wall playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When unbonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theatre system. The bonded playback devices 102a, 102b, 102j, and 102k may form a single Zone D (FIG. 3E).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Office have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103g in FIG. 1 named Ceiling may be Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3E, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3E. In some embodiments, a zone group may be given a unique name selected by a user, such as Nick's Room, as also shown in FIG. 3E.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Balcony may indicate that the Balcony is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the media playback system 100 may variables or identifiers representing other associations of zones and zone groups, such as identifiers associated with Areas, as shown in FIG. 3. An area may involve a cluster of zone groups and/or zones not within a zone group. For instance, FIG. 3E shows a first area named Front Area and a second area named Back Area. The Front Area includes zones and zone groups of the Balcony, Living Room, Dining Room, Kitchen, and Bathroom. The Back Area includes zones and zone groups of the Bathroom, Nick's Room, the Bedroom, and the Office. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In embodiments described below, the memory 216 is configured to store a set of command data for selecting a particular VAS, such as the first VAS 160, when processing voice inputs.

During operation, one or more playback zones in the environment of FIG. 1 may each be playing different audio content. For instance, the user may be grilling in the Balcony zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being playing by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices 102 in the Living Room zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Living Room zone in such a manner may allow one user to listen to music in the listening zone in one area of the living room space, and another user to watch the television in another area of the living room space. In a related example, a user may implement either of the NMD 103*a* or 103*b* to control the Living Room zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the media playback system 100.

c. Example Controller Devices

Figure 4:
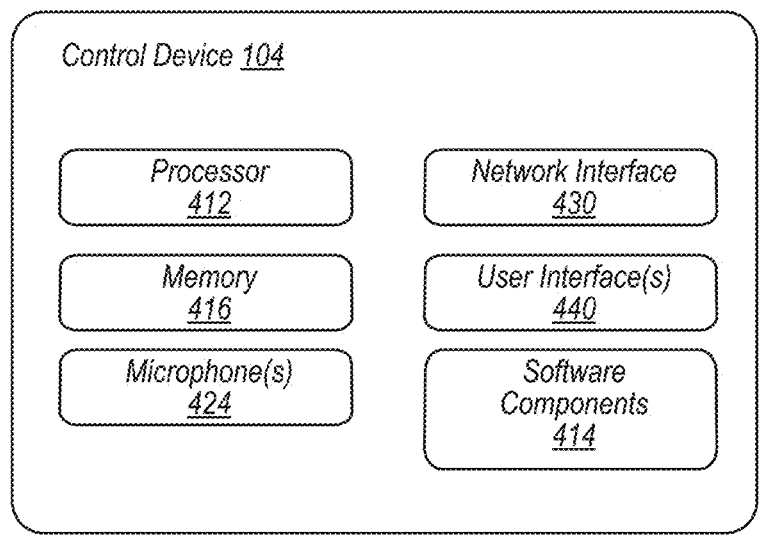
FIG. 4 is a functional block diagram of an example controller device in accordance with aspects of the disclosure.

FIG. 4 is a functional block diagram illustrating certain aspects of a selected one of the controller devices 104 of the media playback system 100 of FIG. 1. Such controller devices may also be referred to as a controller. The controller device shown in FIG. 3 may include components that are generally similar to certain components of the network devices described above, such as a processor 412, memory 416, microphone(s) 424, and a network interface 430. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™").

The memory 416 of a controller device may be configured to store controller application software and other data associated with the media playback system 100 and a user of the system 100. The memory 416 may be loaded with one or more software components 414 executable by the processor 412 to achieve certain functions, such as facilitating user access, control, and configuration of the media playback system 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the media playback system 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

The user interface(s) 440 of a controller device may be configured to facilitate user access and control of the media playback system 100, by providing controller interface(s) such as the controller interfaces 440*a* and 440*b* shown in FIGS. 4A and 4B, respectively, which may be referred to collectively as the controller interface 440. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device. In some embodiments, a user may assign a VAS exclusively to one or more network microphone devices. For example, a user may assign the first VAS 160 to one or both of the NMDs 102a and 102b in the Living Room shown in FIG. 1, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

c. Example Network Microphone Devices

Figure 5A:
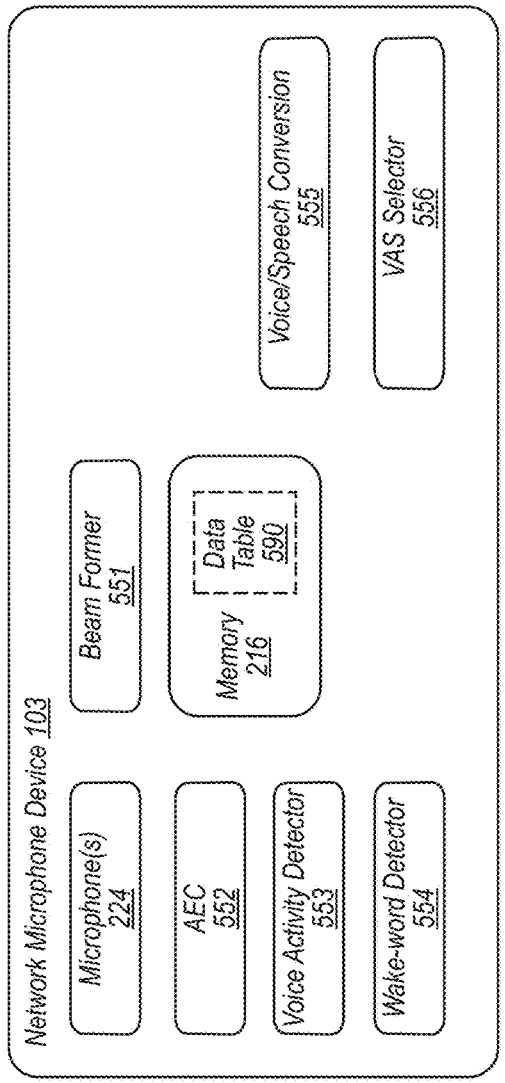
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 1), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beam former components 551, acoustic echo cancellation (AEC) components 552, voice activity detector components 553, wake word detector components 554, speech/text conversion components 555 (e.g., voice-to-text and text-to-voice), and VAS selector components 556. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wakewords.

In some embodiments, the wake-word detector 554 runs multiple wake word detections algorithms on the received audio simultaneously (or substantially simultaneously). As noted above, different voice services (e.g. AMAZON's ALEXA®, APPLE's SIRI®, or MICROSOFT's CORTANA®) each use a different wake word for invoking their respective voice service. To support multiple services, the wake word detector 554 may run the received audio through the wake word detection algorithm for each supported voice service in parallel.

The VAS selector components 556 are configured to detect for commands spoken by the user within a voice input. The speech/text conversion components 555 may facilitate processing by converting speech in the voice input to text. In some embodiments, a network microphone device may include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional VASes, which typically sample from a broad base of users and diverse requests that are not targeted to media playback systems The VAS selector components 556 are also configured to determine if certain command criteria are met for particular command(s) detected in a voice input. Command criteria for a given command in a voice input may be based, for example, on the inclusion of certain keywords within the voice input. A keyword may be, for example, a word in the voice input identifying a particular device or group in the media playback system 100. As used herein, the term "keyword" may refer to a single word (e.g., "Bedroom") or a group of words (e.g., "the Living Room").

In addition or alternately, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The VAS selector components 556 may store in the memory 216 a set of command information, such as in a data table 590, that contains a listing of commands and associated command criteria, which are described in greater detail below.

In some embodiments, one or more of the components 551-556 described above can operate in conjunction with the microphone(s) 224 to detect and store a user's voice profile, which may be associated with a user account of the media playback system 100. In some embodiments, voice profiles may be stored as and/or compared to variables stored in the set of command information 590, as described below. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. The location or proximity of a user may be detected and compared to a variable stored in the command information 590, as described below. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is incorporated herein by reference in its entirety.

Figure 5B:
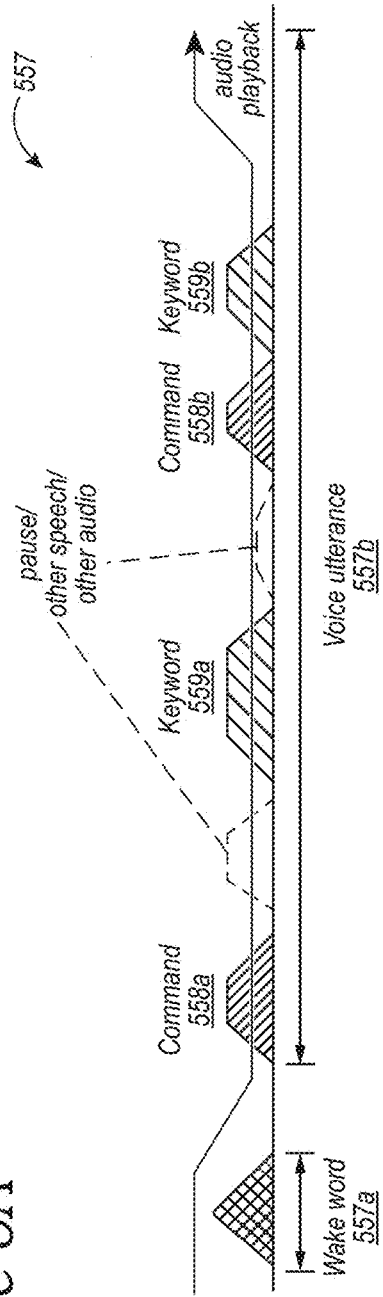
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®). In other embodiments, the voice input 557 may not include a wake word.

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in previously referenced U.S. patent application Ser. No. 15/438,749.

f. Example Network and Remote Computing Systems

Figure 6:
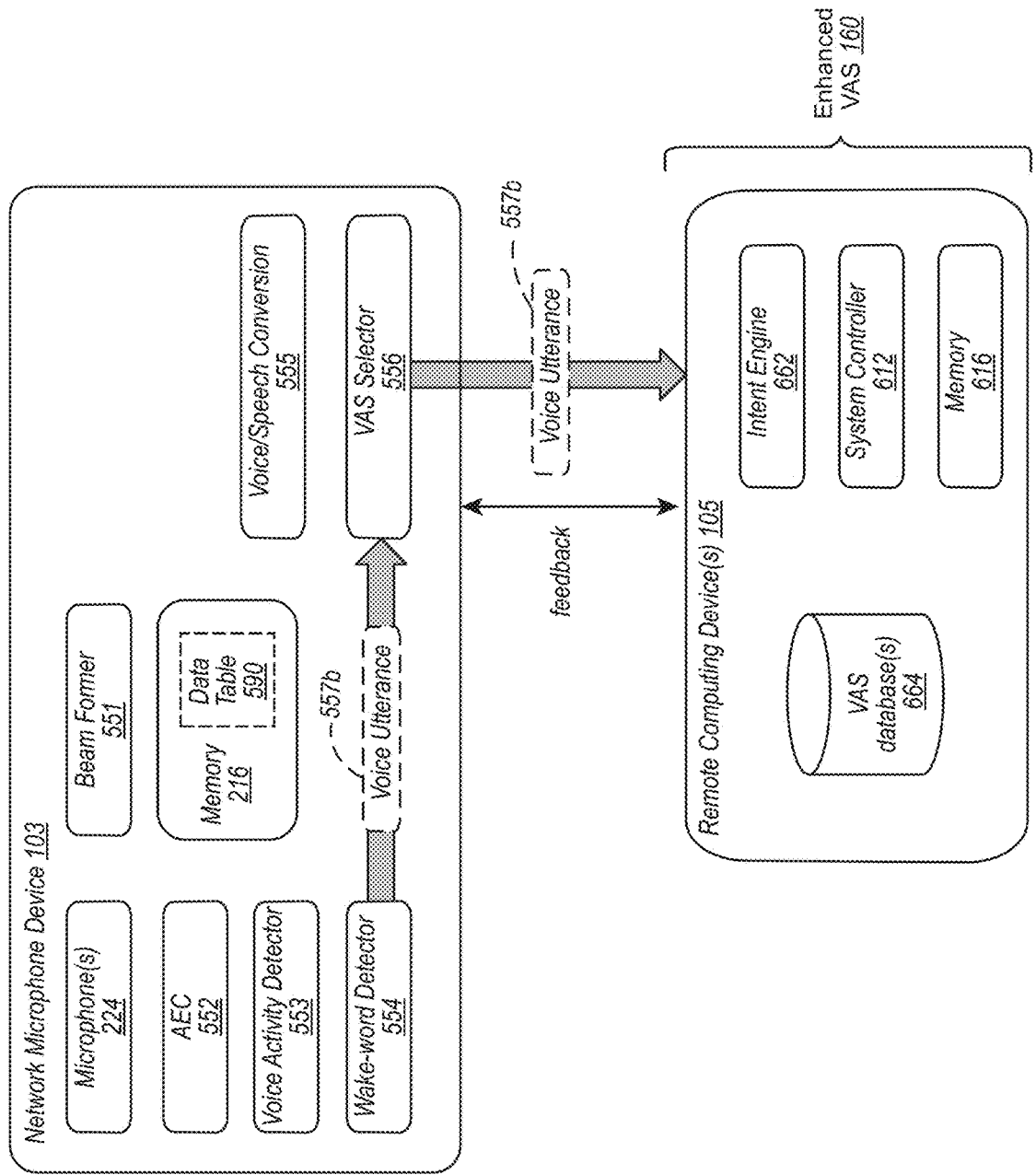
FIG. 6 is a functional block diagram of example remote computing device(s) in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B).

The remote computing device(s) 105 includes a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in previously referenced U.S. patent application Ser. No. 15/438,749.

Processing of a voice input by devices of the media playback system 100 may be carried out at least partially in parallel with processing of the voice input by the remote computing device(s) 105. Additionally, the speech/text conversion components 555 of a network microphone device may convert feedback responses from the remote computing device(s) 105 to speech for audible output via one or more speakers.

Figure 7A:
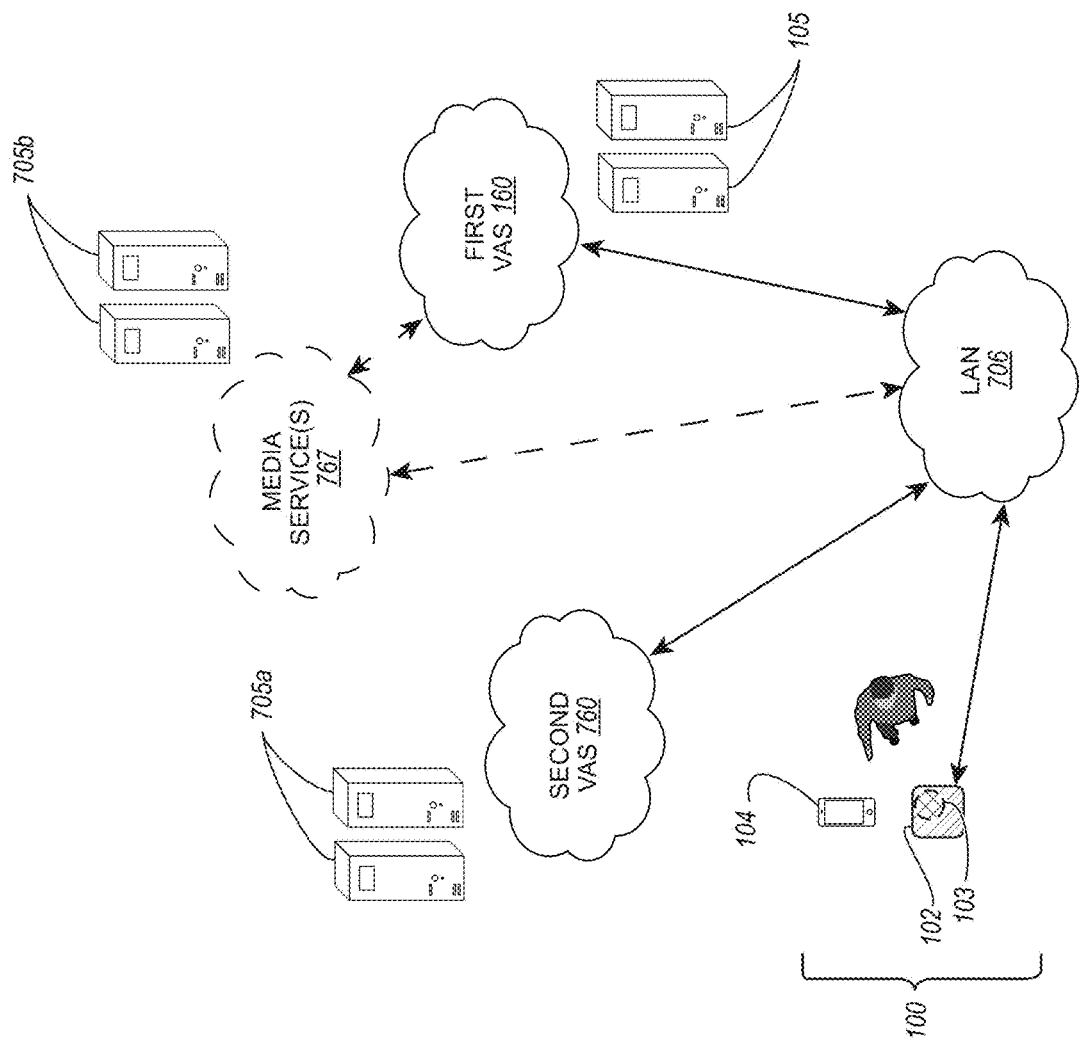
FIG. 7A is a schematic diagram of an example network system in accordance with aspects of the disclosure.

In accordance with various embodiments of the present disclosure, the remote computing device(s) 105 carry out functions of the first VAS 160 for the media playback system 100. FIG. 7A is schematic diagram of an example network system 700 that comprises the first VAS 160. As shown, the remote computing device(s) 105 are coupled to the media playback system 100 via the WAN 107 (FIG. 1) and/or a LAN 706 connected to the WAN 107. In this way, the various playback, network microphone, and controller devices 102-104 of the media playback system 100 may communicate with the remote computing device(s) 105 to invoke functions of the first VAS 160.

The network system 700 further includes additional first remote computing device(s) 705a (e.g., cloud servers) and second remote computing device(s) 705b (e.g., cloud servers). The second remote computing device(s) 705b may be associated with a media service provider 767, such as SPOTIFY® or PANDORA®. In some embodiments, the second remote computing device(s) 705b may communicate directly the computing device(s) of the first VAS 160. In addition or alternatively, the second remote computing device (s) 705b may communicate with the media playback system 100 and/or other intervening remote computing device(s).

The first remote computing device(s) 705a may be associated with a second VAS 760. The second VAS 760 may be a traditional VAS provider associated with, e.g., AMAZON's ALEXA®, APPLE's SIRI®, MICROSOFT's CORTANA®, or another VAS provider. Although not shown for purposes of clarity, the network computing system 700 may further include remote computing devices associated with one or more additional VASes, such as additional traditional VASes. In such embodiments, media playback system 100 may be configured to select the first VAS 160 over the second VAS 760 as well as another VAS.

Figure 7B:
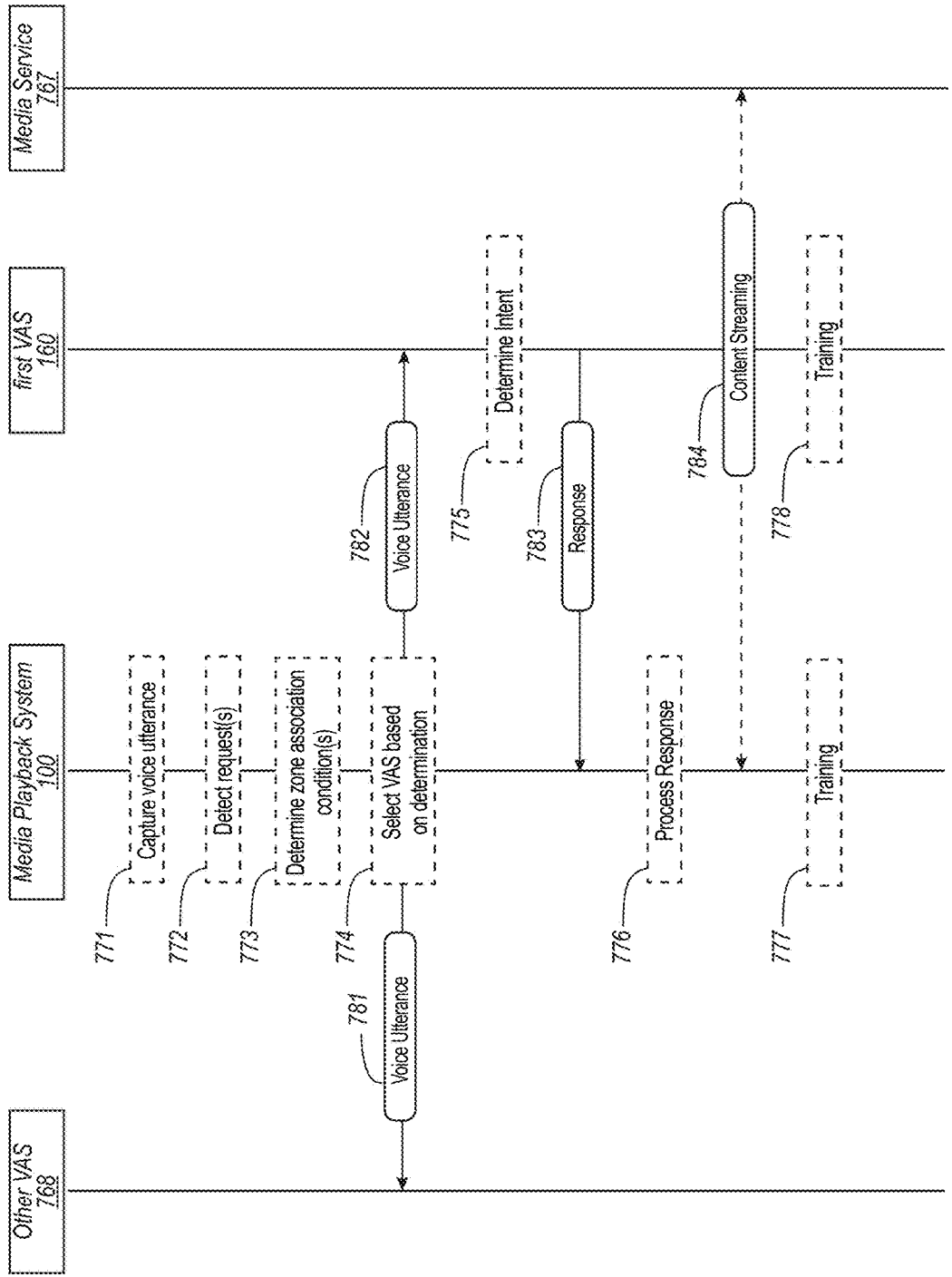
FIG. 7B is an example message flow implemented by the example network system of FIG. 7A in accordance with aspects of the disclosure.

FIG. 7B is a message flow diagram illustrating various data exchanges in the network computing system 700 of FIG. 7A. The media playback system 100 captures a voice input via a network microphone device (block 771), such as via one or more of the NMDs 103 shown in FIG. 1. The media playback system 100 may select an appropriate VAS based on commands and associated command criteria in the set of command information 590 (blocks 771-774), as described below. If the second VAS 760 is selected, the media playback system 100 may transmit one or messages 781 (e.g., packets) containing the voice input to the second VAS 760 for processing.

If, on the other hand, the first VAS 160 is selected, the media playback system 100 transmits one or more messages 782 (e.g., packets) containing the voice input to the VAS 160. The media playback system 100 may concurrently transmit other information to the VAS 160 with the message(s) 782. For example, the media playback system 100 may transmit data over a metadata channel, as described in previously referenced U.S. patent application Ser. No. 15/131,244.

The first VAS 160 may process the voice input in the message(s) 782 to determine intent (block 775). Based on the intent, the VAS 160 may send one or more response messages 783 (e.g., packets) to the media playback system 100. In some instances, the response message(s) 783 may include a payload that directs one or more of the devices of the media playback system 100 to execute instructions (block 776). For example, the instructions may direct the media playback system 100 to play back media content, group devices, and/or perform other functions described below. In addition or alternately, the response message(s) 783 from the VAS 160 may include a payload with a request for more information, such as in the case of multi-turn commands.

In some embodiments, the response message(s) 783 sent from the first VAS 160 may direct the media playback system 100 to request media content, such as audio content, from the media service(s) 667. In other embodiments, the media playback system 100 may request content independently from the VAS 160. In either case, the media playback system 100 may exchange messages for receiving content, such as via a media stream 784 comprising, e.g., audio content.

In some embodiments, the media playback system 100 may receive audio content from a line-in interface on a playback, network microphone, or other device over a local area network via a network interface. Example audio content includes one or more audio tracks, a talk show, a film, a television show, a podcast, an Internet streaming video, among many possible other forms of audio content. The audio content may be accompanied by video (e.g., an audio track of a video) or the audio content may be content that is unaccompanied by video.

In some embodiments, the media playback system 100 and/or the first VAS 160 may usc voice inputs that result in successful (or unsuccessful) responses from the VAS for training and adaptive training and learning (blocks 777 and 778). Training and adaptive learning may enhance the accuracy of voice processing by the media playback system 100 and or the first VAS 160. In one example, the intent engine 662 (FIG. 6) may update and maintain training learning data in the VAS database(s) 664 for one or more user accounts associated with the media playback system 100.

III. Example Method and System for Invoking a VAS

As discussed above, embodiments described herein may involve invoking the first VAS 160. In one aspect, the first VAS 160 may provide enhanced control features for the media playback system 100. In another aspect, the first VAS may provide an improved VAS experience for controlling the media playback system 100 compared to other VASes, such as traditional VASes, as discussed above.

In some embodiments, a traditional VAS, such as the second VAS 760 shown in FIG. 7B, may be invoked by the media playback system 100 to perform relatively rudimentary controls, such as relatively simple play/pause/skip functions. In some implementations, the second VAS 760 may provide other services that may not be readily invokable via the first VAS 160. For example, in certain implementations a traditional VAS may provide voice-based Internet searching, while the first VAS 160 may not.

FIG. 8 is an example flow diagram of a method 800 for invoking a VAS. The method 800 presents an embodiment of a method that can be implemented within an operating environment involving, for example, the media playback system 100 or another media playback system configured in accordance with embodiments of the disclosure. In the example described below, the method 800 involves selecting the first VAS 160 over the second VAS 760.

The method 800 may involve transmitting and receiving information between various devices and systems as described herein and/or in previously referenced U.S. patent application Ser. No. 15/438,749. For example, the method may involve transmitting and receiving information between one or more of the playback, network microphone, controller, and remote computing devices 102-104 of the playback system, the remote computing device(s) 705b of the media service(s) 667, and/or the remote computing device(s) 705a of the second VAS 670. Although the blocks in FIG. 8 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. The computer readable medium may be comprised by one or more of the memories described above with reference to the various playback, network microphone, controller, and remote computing devices. In addition, for the method 800 and other processes and methods disclosed herein, each block in FIG. 8 may represent circuitry that is wired to perform the specific logical functions in the process.

Figures 8A, 8B:
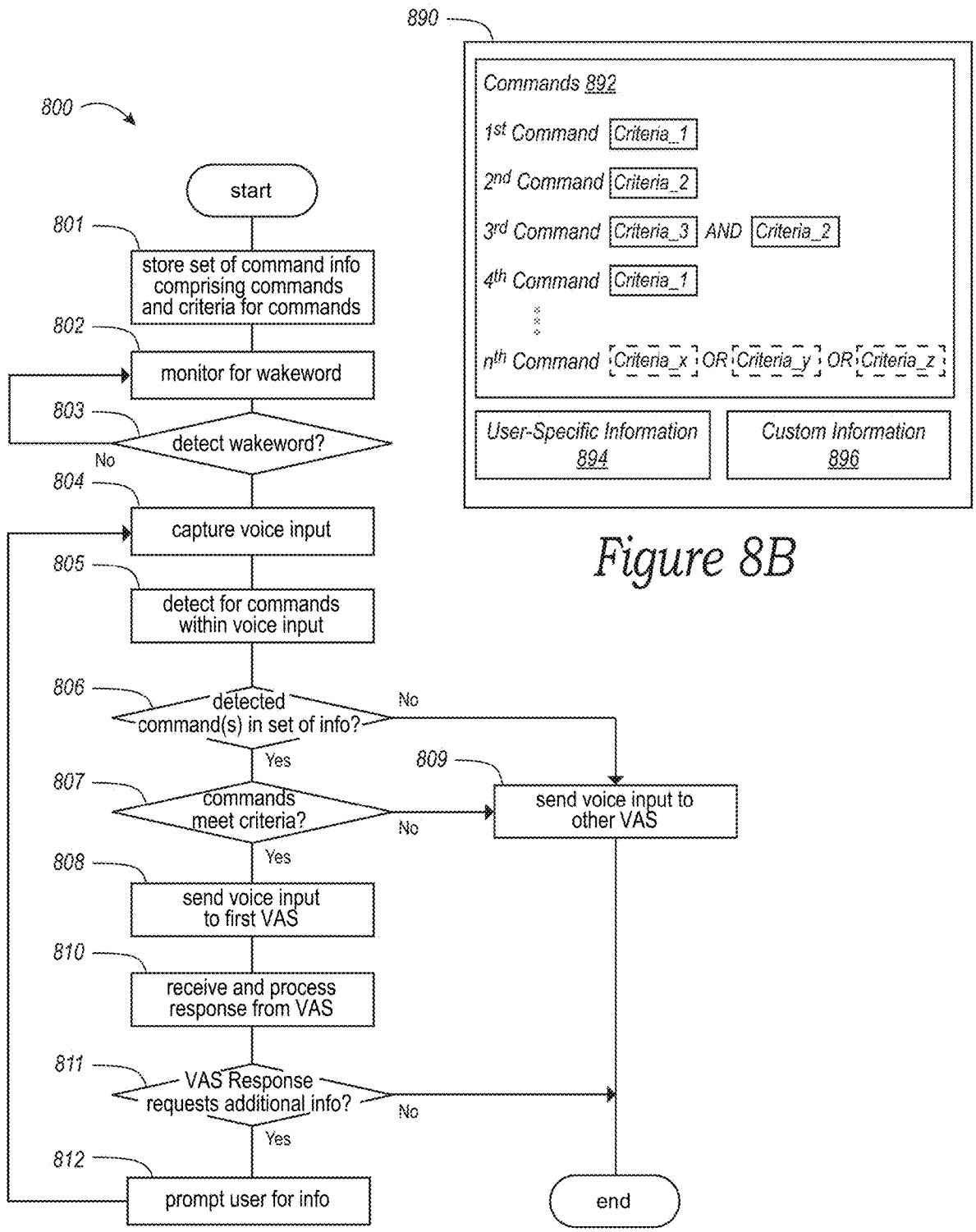
FIG. 8A is a flow diagram of an example method for invoking a voice assistant service in accordance with aspects of the disclosure.
FIG. 8B is a block diagram of an example set of command information in accordance with aspects of the disclosure.

In some embodiments, the method 800 may further involve receiving user input for launching an application, receiving user and user account information, determining system parameters, interacting with a music service, and/or interacting with a controller, such as for displaying, selecting, and entering system information. In various embodiments, the method 800 may incorporate example methods and systems described in application Ser. No. 15/223,218 filed Jul. 29, 2016, and titled "Voice Control of a Media Playback System," which is incorporated herein by reference in its entirety.

a. Causing a Set of Command Information Comprising a Listing of Commands and Associated Criteria of the Commands to be Stored in Memory At block 801, the method 800 involves storing a set of command information, such as the set of command information 590 stored in the memory 216 of a network microphone device. Referring to FIG. 8B, an example set of command information 890 may contain a listing of commands 892. The set of command information 890 may be a data table or other data structure. The set of command information 890 may be stored, for example, in the memory of one or more of the playback, controller, network microphone, and/or remote computing devices 102-105. In some embodiments, the set of command information 890 may be accessible via the metadata exchange channel and/or any other communication path between the media playback system and a remote computing system.

In the illustrated example, the set of commands 892 includes $1^{st}$ through $n^{th}$ Commands. As an example, the $1^{st}$ Command may be a command for initiating playback, such as when the user says "play music." The $2^{nd}$ Command may be a control command, such as a transport control command, for e.g., pausing, resuming, skipping, playback. For example, the $2^{nd}$ command may be a command involving a user asking to "skip to the next track in a song." The $3^{rd}$ Command may be a zone targeting command, such as command for grouping, bonding, and merging playback devices. For example, the $3^{rd}$ command may be a command involving a user asking to "group the Living Room and the Dining Room."

The commands described herein are examples and other commands are possible. For example, FIGS. 9A-9C show tables with additional example playback initiation, control, and zone targeting commands. As an additional example, commands may include inquiry commands. An inquiry command may involve, for example, a query by a user as to what audio is currently playing. For example, the user may speak an inquiry command of "Tell me what is playing in the Living Room."

As further shown in FIG. 8B, the commands 892 are associated with command criteria also stored in the set of command data 890. For example, the $1^{st}$ Command is associated with one or more first command Criteria_1, the $2^{nd}$ Command is associated with one or second command Criteria_2, and the $3^{rd}$ Command is associated with one or more third command Criteria_3. The command criteria may involve determinations relating to certain variable instances. Variables instances may be stored with identifiers (e.g., tags), which may or may not be associated with a user account. Variable instances may be continuously, periodically, or aperiodically updated to include new custom names added or removed by the user or associated with the user's account. A custom name may be any name supplied by the user which may or might not already exist in a database Variables instances may be present in keywords in voice input; referenced as names and/or values stored in a state table; and/or dynamically stored and modified in a state table via one or more the playback, network microphone, controller, and remote computing devices 102-105. Example variable instances may include zone variable instances, control state variable instances, target variable instances, and other variable instances. Zone variable instances may involve, for example, identifiers representing zones, zone groups, playback devices, network microphone devices, bonded states, areas, etc., including those described above. Control state variables may involve, for example, a current control state of individual playback and network microphone devices and/or multiple devices, such as information indicating devices playing music, volumes of the devices, queues stored on the devices, etc. Target variable instances may involve, for example, certain control state and/or advanced state information corresponding to a group of devices, bonded devices, and merged devices. Target variable variables may also correspond to a calibration state, such as equalization settings, of various devices in the media playback system 100.

Other variable instances are possible. For example, a media variable instance may identify media content, such as audio content (e.g., a particular track, album, artist, playlist, station, or genre of music). In some embodiments, media variables may be identified in response to searching a database for audio or content desired by user. A media variable may be present in a voice input; referenced, maintained, and updated in a state table; referenced in query, as discussed above. As another example, certain variable instances may indicate a location or proximity of a user within a home environment, whether a user's voice profile is detected in a given voice input, whether a specific wake word is detected, etc. Variable instances may include custom variable instances.

In certain embodiments, at least some of the criteria stored in the set of command information 890 may include a scalar vector of variable instances or other such set of variable instances. For example, Criteria_1 may include a vector that identifies zone variables representing the zones shown in the media playback system 100 of FIG. 1. Such a vector may include [Balcony, Living Room, Dining Room, Kitchen, Office, Bedroom, Nick's Room]. In one embodiments, Criteria_1 may be satisfied if two or more of the zone variables within the vector are detected as keywords in a voice input.

The set of command information 890 may also include other information, such as user-specific information 894 and custom information 896. User-specific information 894 may be associated with a user account and/or a household identifier (HHI). Custom information 896 may include, for example, custom variables, such as custom zone names, custom playlists, and/or custom playlist names. For instance, "Nick's Faves" may be a custom playlist with a custom name created by the user.

b. Capturing A Voice Input

Referring back to FIG. 8A, at blocks 802 and 803, the method 800 involves monitoring for and detecting a wake word in a voice input. For instance, the media playback system 100 may analyze received audio representing voice input to determine if wake words are represented. The media playback system 100 may analyze received audio using one or more wake word detection algorithms, such as via a wake-word detection component, as discussed above.

At block 804, the method 800 involves capturing the voice input following detection of the wake word at blocks 802 and 803. In various embodiments, the voice input may be captured via one or more of the NMDs 103 of the playback system 100. As used herein, the terms "capture" or "capturing" can refer to a process that includes recording at least a portion of a voice input, such as a voice utterance following the wake word. In some embodiments, the captured voice input may include the wake word. In certain embodiments described below the terms "capture" or "capturing" can also refer to recording at least a portion of a voice input and converting the voice input to a particular format, such as text, using e.g., speech to text conversion.

c. Detecting One or More of the Commands within the Captured Voice Input

At blocks 805 and 806, the method 800 involves detecting one or more commands 892 (FIG. 8B) within voice input captured at block 804. In various embodiments, the method 800 may detect commands by parsing voice input and determining if one of the command 892 has a syntax that matches a syntax found in the captured voice input. In this manner, the method 800 may using the matching syntax to detect an intent of a command in the voice input. The matching syntax may be a word, a group of words, a phrase, etc. In one example command, the user may say "play The Beatles in the Balcony and the Living Room." In this example, the method 800 may recognize the syntax to "play" as matching a syntax for the $1^{st}$ playback initiation Command in the set of command information 890. Additionally, the method 800 may recognize "The Beatles" as a media variable, and the "Balcony" and "Living Room" as zone variables. Accordingly, the syntax of the command may also be represented in terms of variable instances as follows: "Play [media variable] in [first zone variable] and the [second zone variable]." A similar command may include "Let me hear [media variable] in [first zone variable] and the [second/group device variable]." "Let me hear" may be a cognate of the "play" intent, as discussed below.

In some embodiments, a user may speak a command that is accompanied by one zone variable instance or no zone variable instance. In one example, a user may give a voice input by simply saying "play some Beatles." In such a case, the method 800 may determine an intent to "play some Beatles" in a default zone. In another case, the method 800 may determine an intent to "play some Beatles" on one or more playback devices based on other command criteria that may be satisfied for the command, such if the user's presence is detected in a particular zone while the user requests to play The Beatles. For example, the media playback system 100 may playback some Beatles in the Living Room zone shown in FIG. 1 if the voice input is detected by the RIGHT playback device 102a located in this zone.

Another example command may be a play next command which may cause a selected media content to be added to the top of a queue to be played next in a zone. An example syntax for this command may be to "play [media variable] next."

Another example of a command may be a move or transfer command which may move or transfer currently playing music and/or the playback queue of a zone from one zone to another. For example, a user may speak the voice input of "Move music to [zone variable]" where the command word "move" or "transfer" may correspond to an intent to move playback state to another zone. As a related example, the intent of moving music may correspond to two media playback system commands. The two commands may be to group a first zone with a second zone and then to remove the second zone from the group to in effect transfer the state of the second zone to the first zone.

The intent for commands and variable instances that may be detected in voice input may be based on any of number predefined syntaxes that may be associated with a user's intent (e.g., play, pause, adding to queue, grouping, other transport controls, controls available via, e.g., the control devices 104). In some implementations, processing of commands and associated variable instances may be based on predetermined "slots" in which command(s) and/or variable(s) are expected to be specified in the syntax. In these and other implementations, sets of words or vocabulary used for determining user intent may be updated in response to user customizations and preferences, feedback, and adaptive learning, as discussed above.

In some embodiments, different words, syntaxes, and/or phrases used for a command may be associated with the same intent. For example, including the command word "play," "listen," or "hear" in a voice input may correspond to a cognate reflecting the same intent that the media playback system play back media content.

FIGS. 9A-9C show further examples of cognates. For instance, the commands in the left-hand side of the table 900 may have certain cognates represented in the right-hand side of the table. Referring to FIG. 9A, for example, the "play" command in the left-hand column has the same intent as the cognate phrases in the right-hand column, including "break it down," "let's jam", "bust it." In various embodiments, commands and cognates may be added, removed, or edited in the table 900. For example, commands and cognates may be added, removed, or edited in response to user customizations and preferences, feedback, training, and adaptive learning, as discussed above. FIGS. 9B and 9C show examples cognates related to control and zone targeting, respectively.

In some embodiments, variable instances may have cognates that are predefined in a manner similar to cognates for commands. For example, a "Balcony" zone variable in the media playback system 100 may have the cognate "Outside" representing the same zone variable. As another example, the "Living Room" zone variable may have the cognates "Living Area", "TV Room," "Family Room," etc.

d. Determining that the One or More Commands Meet Corresponding Criteria in the Set of Command Information Referring to FIGS. 8A and 8B together, at block 807, the method 800 involves determining that the one or more commands detected in block 806 meet corresponding command criteria in the set of command information 890. Referring to FIG. 8B, for example, if the $1^{st}$ command is detected, the method 800 will determine if the $1^{st}$ command meets the Criteria_1; if the $2^{nd}$ Command is detected, the method 800 will determine if the command meets Criteria_2; and so on.

A command may be compared to multiple sets of command criteria. In some embodiments, certain sets of criteria may be associated with logical operators. For example, the $3^{rd}$ Command is compared to command Criteria_2 and command Criteria_3. These commands joined by a logical AND operator. As such, the $3^{rd}$ Command requires two sets of criteria to be met. By contrast, the $n^{th}$ Command is associated with criteria (Criteria_x, Criteria_y, and Criteria_z) that are joined by logical OR operators. In this case, the $n^{th}$ Command must satisfy only one of the sets of command criteria of this command. Various combinations of logical operators, including XOR operators, are possible for determining if a command satisfies certain command criteria.

In some embodiments, command criteria may determine if a voice input includes more than one command. For example, a voice input with a command to "play [media variable]" may be accompanied by a second command to "also play in [zone variable]." In this example, the media playback system 100 may recognize "play" as one command and recognize "also play" as command criteria that is satisfied by the inclusion of the latter command. In some embodiments, when the above example commands are spoken together in the same voice input this may correspond to a grouping intent.

In similar embodiments, the voice input may include two commands or phrases which are spoken in sequence. The method 800 may recognize that such commands or phrases in sequence may be related. For example, the user may provide the voice input "play some classical music" followed by in "the Living Room" and the "Dining Room," which is an inferential command to group the playback devices in the Living Room and the Dining Room.

In some embodiments, the media playback system 100 may detect for pause(s) of a limited duration (e.g., 1 to 2 seconds) when processing words or phrases in sequence. In some implementations, the pause may be intentionally made by the user to demarcate between commands and phrases to facilitate voice processing of a relatively longer chain of commands and information. The pause may have a predetermined duration sufficient for capturing the chain of commands and information without causing the media playback system 100 to idle back to wake word monitoring at block 802. In one aspect, a user may use such pauses to execute multiple commands without having to re-utter a wake word for each desired command to be executed.

c. In Response to the Determining, Selecting the First VAS and Foregoing Selection of the Other VAS and Processing the One or More Commands Via the First VAS A command that satisfies certain predetermined command criteria will cause the media playback system 100 to invoke the first VAS 160, while commands that do not satisfy predetermined criteria may cause the media playback system 100 to invoke another VAS or to not invoke a VAS at all. The example method 800 involves sending a voice input that is determined to satisfy the command criteria of a given command in the voice point to the VAS 160, as shown at blocks 807 and 808, and sending the voice input to another VAS when the given command does not satisfy the criteria, as shown at block 809.

At block 810, the method involves 800 receiving and processing a response from the VAS that received the voice input at block 808. In one embodiment, processing the response from the VA may include processing an instruction from the VAS to execute the command(s) in a voice input, such as playback, control, zone targeting, and other commands discussed above. In some embodiments, a remote computing device may be directed to initiate or control playback of content associated with media variables, which may be included in the initial voice input or be the result of a database search.

In some embodiments, processing the response in block 810 may cause media content to be retrieved. In one embodiment, media variables may be provided to the media playback system 100 as results from a database search for media content. In some embodiments, the media playback system 100 may directly retrieve media content from one or more media services. In other embodiments, the VAS may automatically retrieve media content in conjunction with processing a voice input received at block 800. In various embodiments, media variables may be communicated over the metadata exchange channel and/or any other communication path established between the media playback system 100. Such communications may initiate content streaming, as discussed above with reference to FIG. 7B.

In some embodiments, a database search may return results based on media variables detected in the voice input. For example, the database search may return an artist who has an album named the same as a media variable, the album name which matches or is similar to the media variable, a track named the media variable, a radio station of the media variable, a playlist named the media variable, a streaming service provider identifier of content related to the media variable and/or the raw speech-to-text conversion results. Using the example of "American Pie," the search results may return the artist "Don Mclean," the album(s) named "American Pie," track(s) named "American Pie," radio station(s) named "American Pie" (e.g., identifier for Pandora radio station for "American Pie"), a music service (e.g., streaming music service such as SPOTIFY® or PANDORA®) track identifier for the track "American Pie" (e.g., SPOTIFY® track identifier for "American Pie", URI, and/or URL) and/or the raw speech-to-text result of "American Pie."

In some embodiments, the method 800 may involve updating playback queues stored on the playback devices in response to the change in a playlist or playback queue stored on a cloud network, such that the portion of the playback queue matches a portion or entirety of the playlist or playback queue in cloud network.

In response to causing an action in the media playback system 100, the method 800 may involve updating and/or storing information relating to the action at block 800. For example, one or more control state, zone state, zone identifiers or other information may be updated at block 800. Other information that may updated may include, for instance, information identifying specific playback device(s) that are currently playing a particular media item and/or a particular media item was added to the queue stored on the playback device(s).

In some embodiments, processing the response in block 810 may lead to a determination that the VAS needs additional information and audibly prompting a user for this information, as shown at blocks 811 and 812. For instance, the method 800 may prompt the user for additional information when executing a multi-turn command. In such cases, the method 800 may return to block 804 to capture additional voice input.

While the methods and systems have been described herein with respect to media content (e.g., music content, video content), the methods and systems described herein may be applied to a variety of content which may have associated audio that can be played by a media playback system. For example, pre-recorded sounds which might not be part of a music catalog may be played in response to a voice input. One example is the voice input "what does a nightingale sound like?" The networked microphone system's response to this voice input might not be music content with an identifier and may instead be a short audio clip. The media playback system may receive information associated with playing back the short audio clip (e.g., storage address, link, URL, file) and a media playback system command to play the short audio clip. Other examples are possible including podcasts, news clips, notification sounds, alarms, etc.

IV. Example Implementations of Voice Control for a Media Playback System

FIGS. 10A-20B are schematic diagrams showing various examples of voice inputs processed by the media playback system 100 and control interfaces which may represent states of the media playback system 100 before or after processing a voice input. As described below, command criteria associated with particular voice command(s) within voice input may provide enhanced voice control for a VAS, such as the VAS 160 discussed above. Voice input may be received by one or more of the NMDs 103, which may or may not be incorporated into one of the playback devices 102, as discussed above.

Although not shown for purpose of clarity, the voice input in the various examples below may be preceded by a wake word, such as "AMAZON's ALEXA® or other wake words, as described above. In one aspect, the same wake word may be used to initiate voice capturing of a voice input that is to be sent to either the first VAS or the second VAS, such as a traditional VAS. In such cases, the user speaking the voice utterance may be unaware that a selection of one VAS over another is occurring behind the scenes. In certain embodiments, a unique wake word, such as "Hey Sonos," may be spoken by the user to invoke the first VAS without further consideration. In this case, the playback system 100 may avert the step of determining to select the first VAS over another VAS.

Figure 10B:
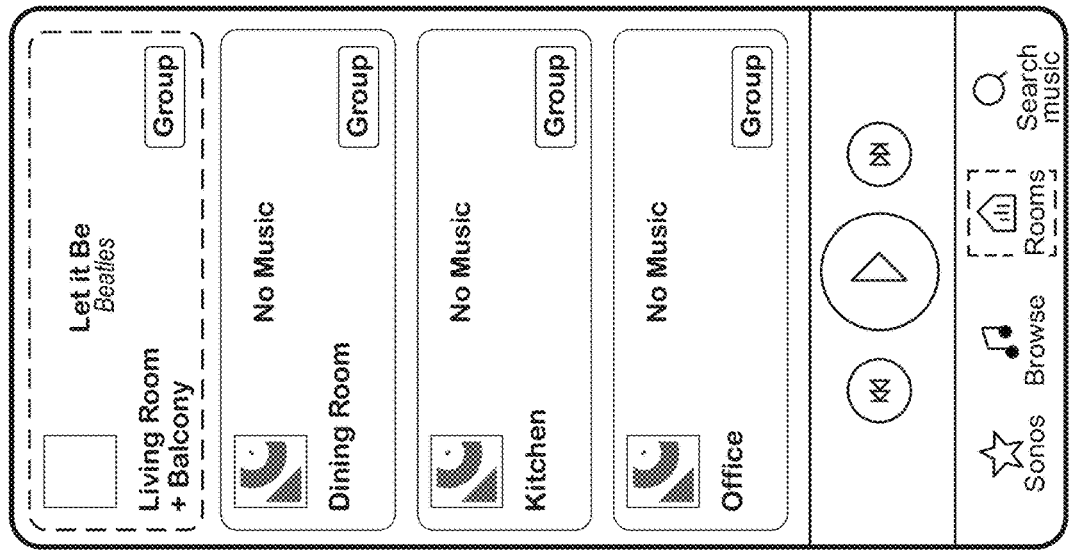
FIGS. 10A, 10B, and 10C are diagrams showing example voice inputs for invoking a VAS in accordance with aspects of the disclosure.
Figure 10A:
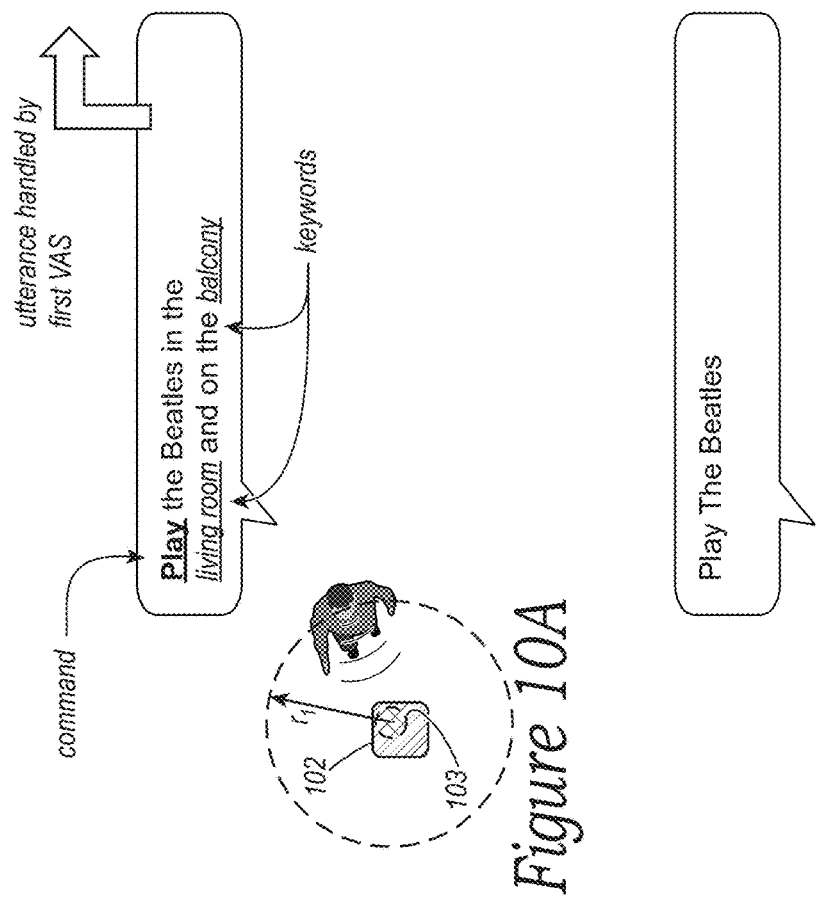

In one aspect, command criteria can be configured to group devices. In some embodiments, such command criteria may simultaneously initiate playback when the voice input involves a media variable and/or affected devices(s) are associated with a playback queue. FIG. 10A, for example, shows a user speaking a voice input to the NMD 103a to "play The Beatles in the living room and the balcony," and the controller interface in FIG. 10B shows the resulting grouping of the Living Room and the Balcony. In another example, the user may speak a specific track, playlist, mood, or other information for initiating media playback as described herein.

The voice input in FIG. 10A includes a syntax structure of "play [media variable] in the [first zone variable] and the [second zone variable]." In this example, the command to play meets command criteria that require two or more zone variables as keywords in the voice input. In some embodiments, the Living Room's playback devices 102a, 102b, 102j, and 102k may remain in a bonded media playback device arrangement before and after speaking the voice input shown in FIG. 10A.

In some embodiments, the order in which the zone variables are spoken may dictate which of the playback device is designated at the "group head." For example, when the user speaks a voice input that contains the keyword Living Room followed by the keyword Balcony, this order may dictate that the Living Room is to be the group head. The group head may be stored as a zone variable in the set of command information 890. The group head may be a handle for referring to a group playback devices. When the user speaks a voice input that contains the group handle, the media playback system 100 may detect an intent referring to all of the device(s) grouped with the Living Room. In this manner, the user need not speak keywords for each zone in a group of devices when collectively controlling the devices. In a related embodiment, the user may speak a voice input to change the group head to another device or zone. For example, the user may change the group head of the Living Room zone to be the Balcony (in such a case the interface may show the order of the group as Balcony+Living Room rather than Living Room+Balcony).

Figure 10C:
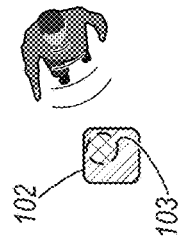

In an alternate example, FIG. 10C shows a user speaking a voice input "to play The Beatles," but omitting the other keywords in the voice input of FIG. 10B. In this example, the voice input may be sent to another VAS if the command does not satisfy any criteria in the set of command information 890, as discussed above.

In another example, a voice input "to play The Beatles" that omits the above keywords may be nevertheless sent to the first VAS 160 if other command criteria are met for the command. Other such command criteria may include, for example, criteria involving zone variables, control state variables, target variables, and/or other variables. In one aspect, a variable instance may be proximity (e.g., a calculated or otherwise determined distance) of the user to a network microphone device. For example, the voice input of FIG. 10C may be sent to the first VAS 160 when the user is detected to be in the vicinity (e.g., with a predetermined radius $r_1$) of the NMD 103. A determination of vicinity may be based, for example, on the signal strength of a voice input source. In another aspect, the voice input of FIG. 10C may be sent to the first VAS 160 when a voice profile of the user is detected, which may be independent of whether the user's proximity is detected.

Figure 11B:
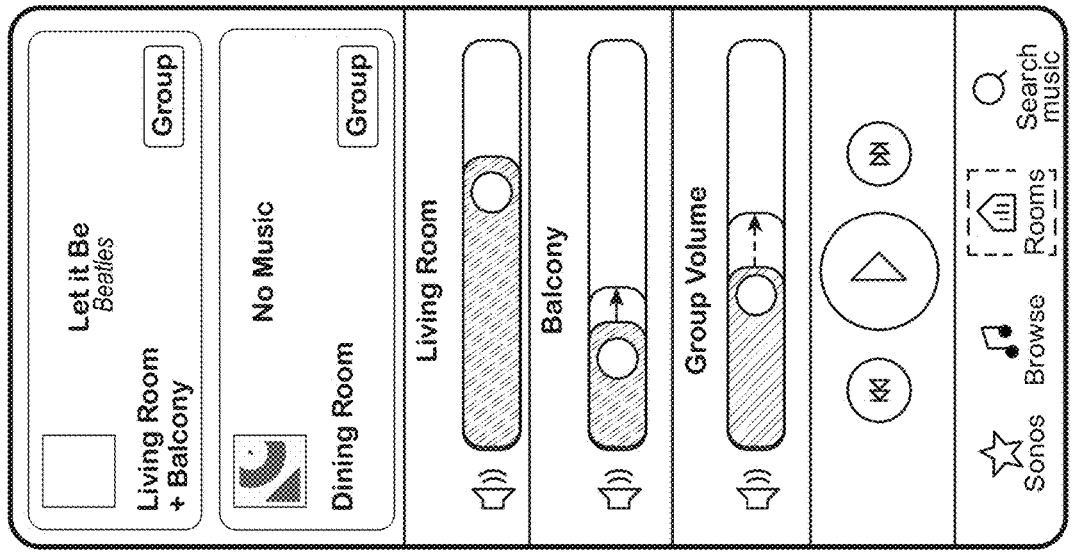
FIGS. 11A and 11B are diagrams showing example voice inputs for invoking a VAS in accordance with aspects of the disclosure.
Figure 11A:
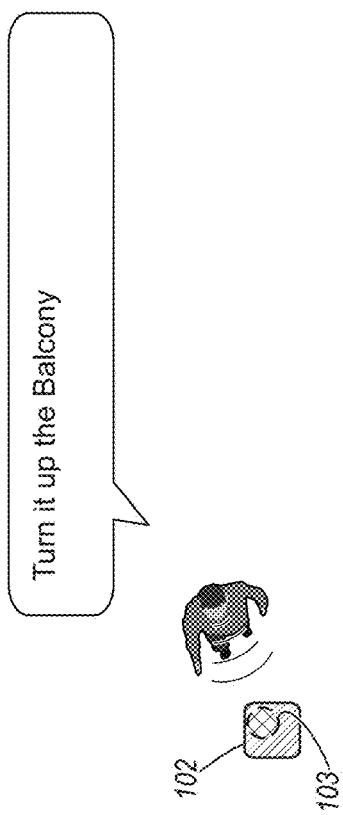

In yet another aspect, proximity and/or other command criteria may facilitate resolving voice inputs that may not be readily processed by a traditional VAS. For example, a user that speaks the voice input to "turn up the Balcony," as shown in FIG. 11A may not be resolvable by a traditional VAS because the Balcony includes an illumination device 108 that may bear the same name. Referring to FIG. 1, the first VAS 160 may resolve such conflicting device names by determining whether the user is in the vicinity of the playback device 102c and/or whether the Balcony is currently playing based on an associated control variable. In a related aspect, the first VAS 160 may determine to increase the volume of the playback device 102c in the Balcony when the user is in its vicinity, but not the volume in the Living Room where the user is not located. In such a case, the media playback system 100 may increase the volume in the Balcony, but not the Living Room, as shown in FIG. 11B.

Similarly, the first VAS 160 may resolve conflicting commands for devices with similar command naming conventions. For instance, the thermostat 110 in the Dining Room shown in FIG. 1 may be programmed by the user speaking a voice input to "set" by the user to a certain temperature (e.g., a level between 60 and 85 degrees). Likewise, the user may speak a voice input to "set" the Dining Room zone to a certain volume level (e.g., a level between 0 and 100 percent). In one example, a user that speaks the voice input "set the Dining Room to 75" may be resolved by the first VAS 160 because the it detects that the Dining Room zone is currently playing based on the command criteria stored in the set of command information 890.

A traditional VAS, by contrast, may not be able to determine whether it is to change the volume of the Dining Room zone to level 75 or to set the temperature of the Dining Room thermostat to 75.

In various embodiments, voice inputs may be processed in conjunction with other inputs from the user via the individual playback, network microphone devices, and controller devices 102-104. For instance, a user may independently control the group volume, the individual volumes, playback state, etc. using the soft buttons and control features on the interface shown in FIG. 11B. Additionally, in the example of FIG. 11B, the user can press the soft button labeled "Group" to access another interface for manually grouping and ungrouping devices. In one aspect, providing multiple ways of interacting the media playback system 100 via voice inputs, controller inputs, and manual device inputs may provide seamless continuity of a control for an enhanced user experience.

As another grouping/ungrouping example, a voice input to "play Bob Marley in the Balcony, may cause the Balcony to automatically ungroup from the Living Room. In such a case, the Balcony may play Bob Marley and the Living Room may continue to play The Beatles. Alternately, the Living Room may cease playback if the command criteria dictate such if the Living Room is no longer a group head of a group of playback devices. In another embodiment, the command criteria may dictate that the devices do not automatically ungroup in response to playback initiation commands.

Figure 12B:
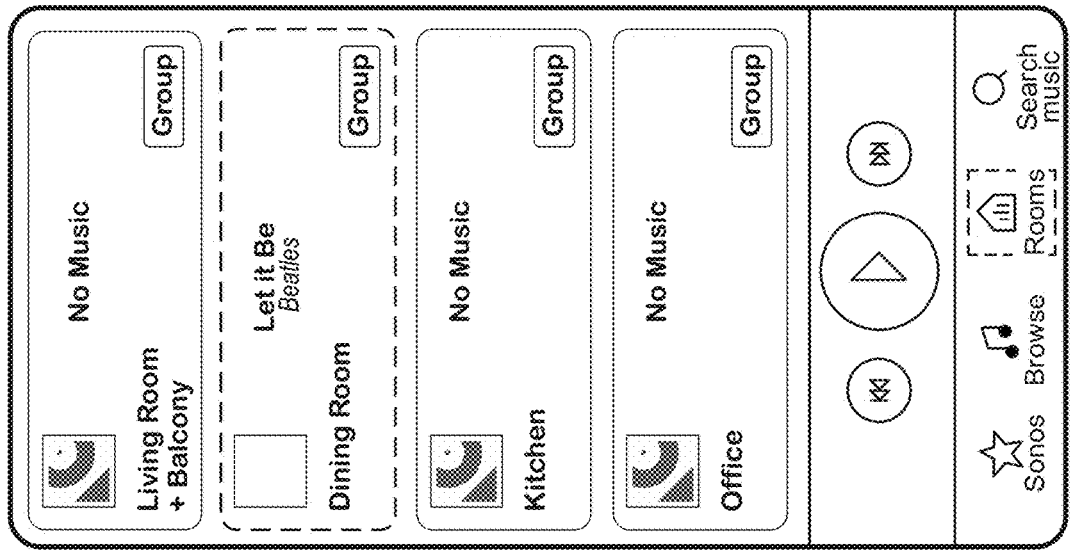
FIGS. 12A and 12B are diagrams showing example voice inputs for invoking a VAS in accordance with aspects of the disclosure.
Figure 12A:
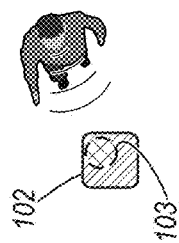

Command criteria may be configured to move or transfer currently playing music and/or the playback queue of a zone from one zone to another. For example, a user may speak the voice input of "move music from the Living Room to the Dining Room," as shown in FIG. 12A. The request to move music may move the music playing in the Living Room zone to the Dining Room, as shown in the controller interface of FIG. 12B. In a related example, the user may move music to the Dining Room by speaking the voice input of "move music here" directly to the NMD 103*f* near the Dining Room shown in FIG. 1. In this case, the user does not expressly refer to the Dining Room, but the VAS 160 may infer the intent based on the user's proximity to the Dining Room. In related embodiments, the VAS 160 may determine to move the music to the Dining Room rather than another adjacent room (such as the Kitchen) if it determines that the NMD 103*f* is bonded to the playback device 102*l* in the Dining Room. In another example, the playback system 100 may infer information from metadata of currently playing content. In one such example, the user may speak "Move 'Let it Be' (or 'The Beatles') to the Dining Room," which identifies the particular music to move to the desired playback zone(s) and/or zone group(s). In this way, the media playback system can distinguish between content that may be actively playing and/or queued for playback in other playback zone(s) and/or zone group(s) for determining which of the content to transfer.

In yet another example, all the devices associated with a group head, such as the Living Room, may cease playback upon moving the music from the group head to the Dining Room. In a related example, the Living Room zone may lose its designation as a group head when music is moved away from it.

Figure 13B:
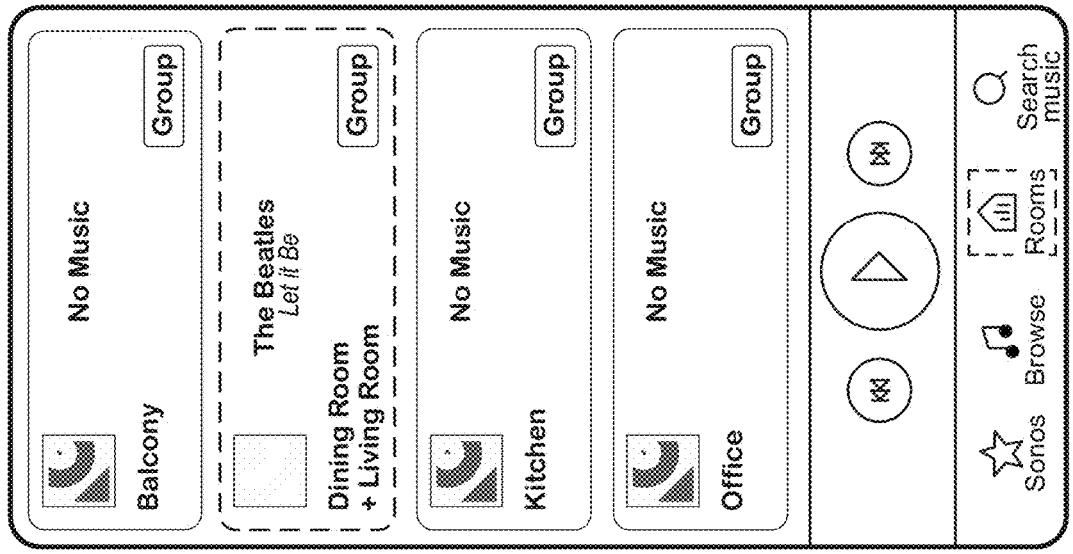
FIGS. 13A and 13B are diagrams showing example voice inputs for invoking a VAS in accordance with aspects of the disclosure.
Figure 13A:
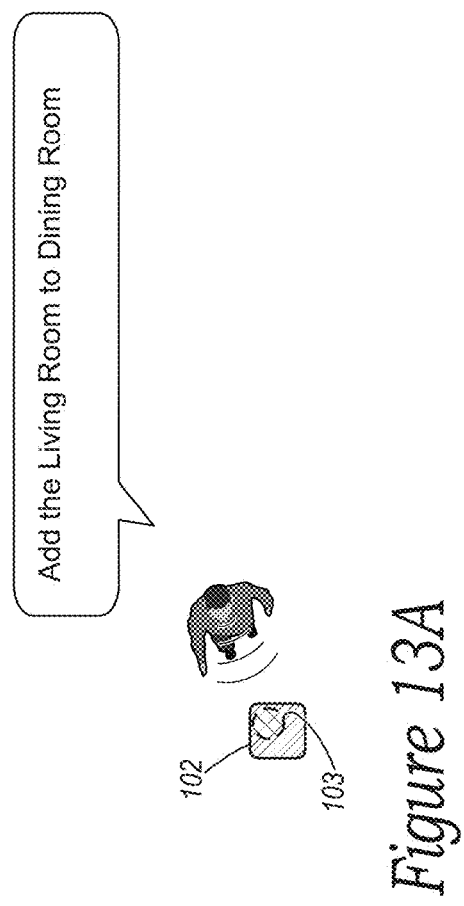

Command criteria may be configured to add devices to existing groups using voice input commands. For example, as shown in FIGS. 13A and 13B, a user may add the Living Room zone back to form a group with Dining Room zone by speaking the voice input of "add Living Room to Dining Room." In related embodiments, the user may add the Living Room by speaking the voice input of "play here, too" directly to the NMD 103*a* in the Living Room zone shown in FIG. 1. In this case, the user may not expressly refer to the living room in the voice input, but the VAS 160 may infer that the Living Room zone is to be added based on the user's proximity. In another example, if one were to assume that a listener is in the Dining Room when he or she has this intent, he or she may speak the command "add the living room." The dining room target in this case may be implied by the input device's containing room.

In yet another example, the user may indicate in a voice input which of the Living Room and the Dining Room is to be the group head, or the VAS 160 may request the user to designate the group head.

Figure 14B:
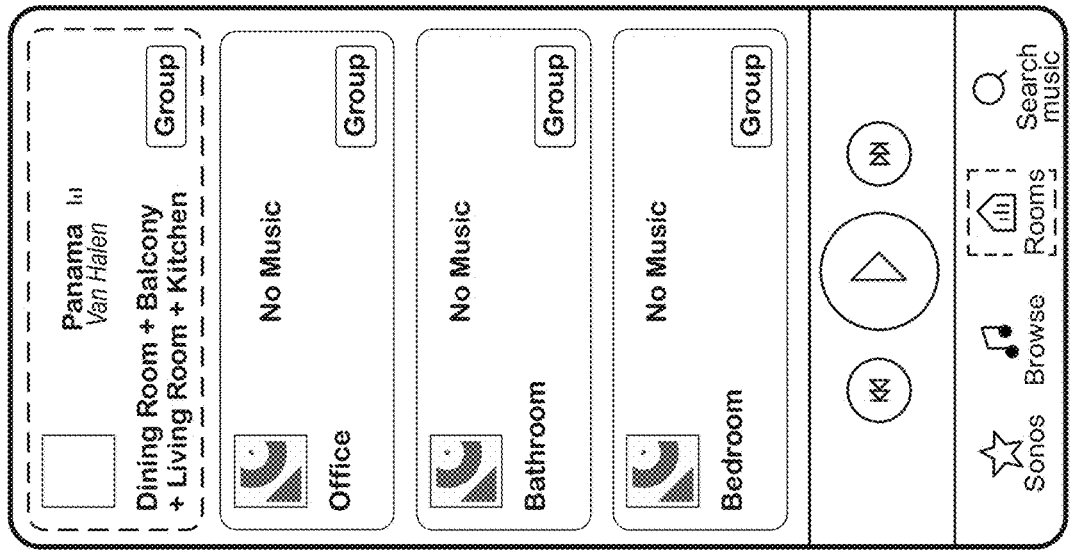
FIGS. 14A and 14B are diagrams showing example voice inputs for invoking a VAS in accordance with aspects of the disclosure.
Figure 14A:
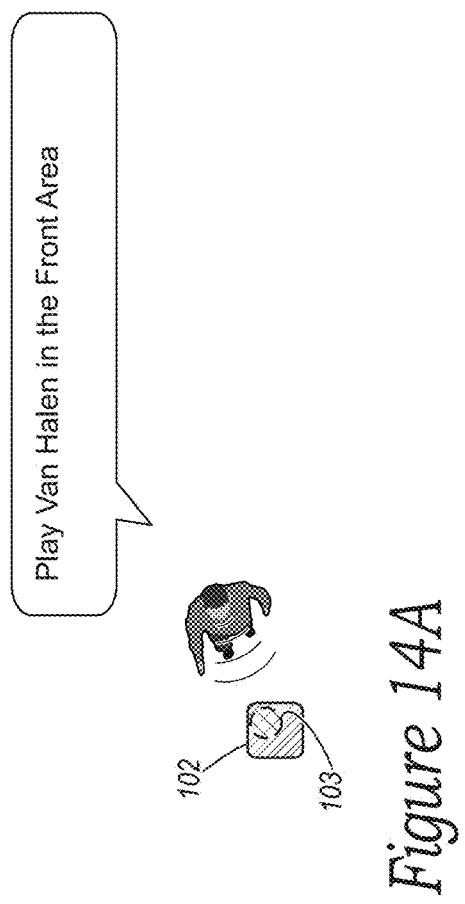

As another example of adding or forming groups, the user may instantiate a group using a voice input with a keyword associated with a custom zone variable. For example, the user may create a custom zone variable for the Front Area discussed above. The user may instantiate the Front Area group by speaking a voice input such as "play Van Halen in the Front Area," as shown in FIGS. 14A and 14B. The previous Dining Room group shown in FIG. 13B may be supplanted in response to the voice input shown in FIG. 14A.

Figure 15B:
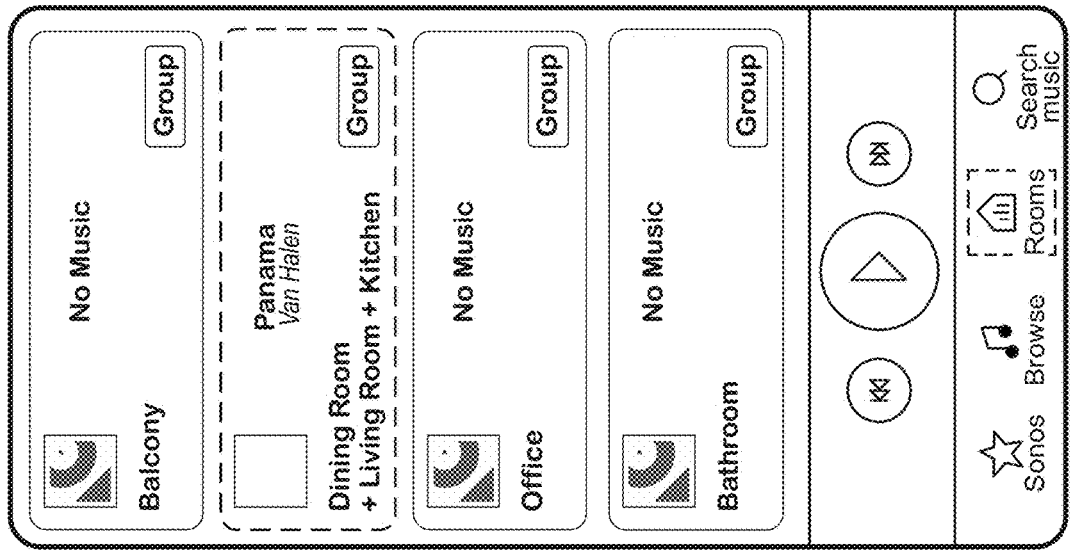
FIGS. 15A and 15B are diagrams showing example voice inputs for invoking a VAS in accordance with aspects of the disclosure.
Figure 15A:
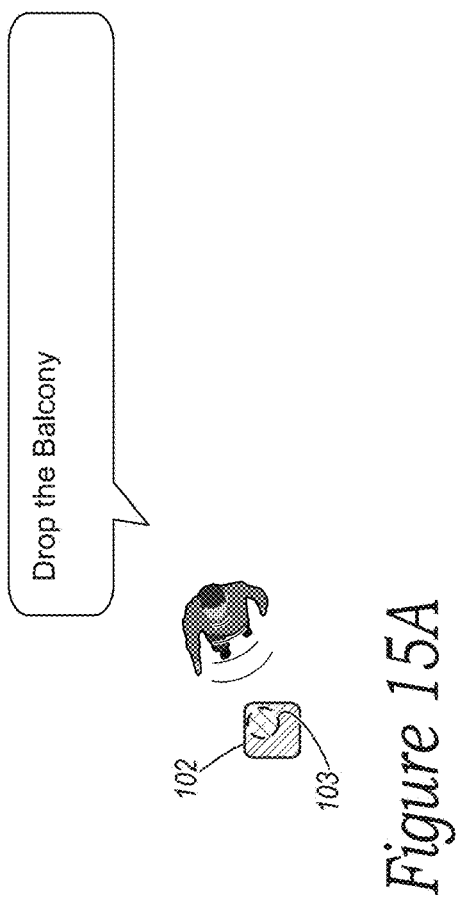

Command criteria may be configured to remove devices to existing groups using voice input commands. For example, the user may speak the voice input of "drop the Balcony" to remove the Balcony from the "Front Area" group, as shown in FIGS. 15A and 15B. As another example, the command "stop/remove" on balcony may do the same. Other example cognates are possible, as discussed above. In yet another example, the user may speak directly to the NMD 103*c* in the Balcony shown in FIG. 1 to achieve the same result, such as by saying "stop here" or "stop in this room," assuming that the user is on the balcony.

Figure 16B:
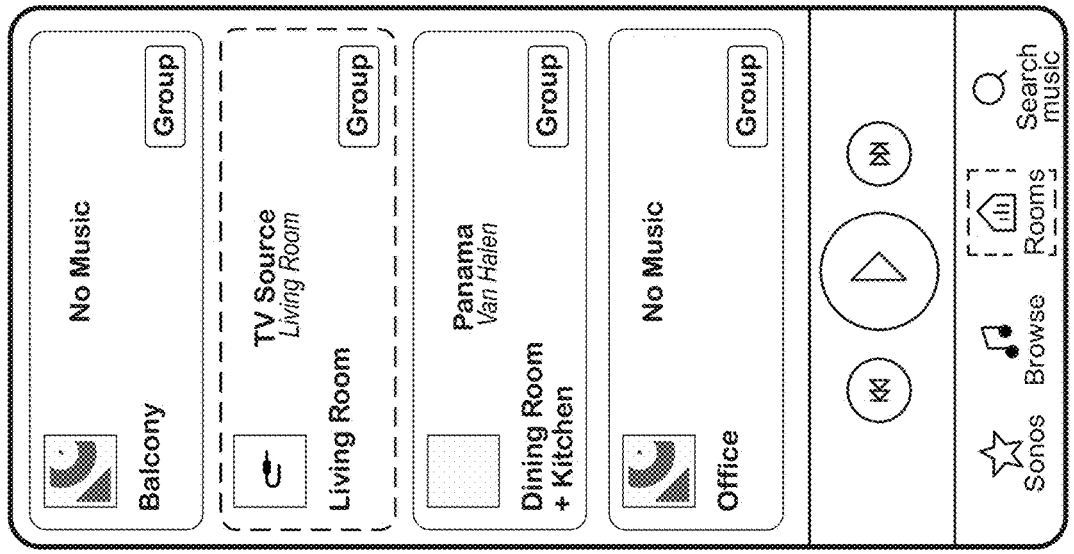
FIGS. 16A and 16B are diagrams showing example voice inputs for invoking a VAS in accordance with aspects of the disclosure.
Figure 16A:
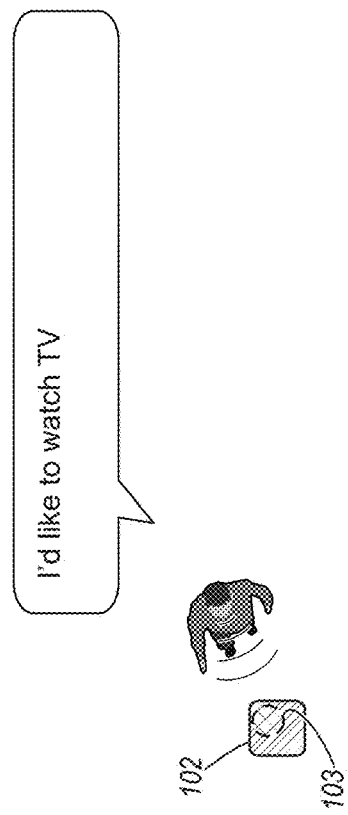

Command criteria may be configured to select audio content sources and implement related features. For example, FIG. 16A shows a user speaking a voice input to the NMD 103*a* that says, "I'd like watch TV." In Response, the media playback system 100 switches an audio content source from a music source to a TV source, as shown in FIG. 16B. In some embodiments, instructing the media playback system 100 to play the TV source may automatically ungroup the Living Room from other zones. For example, in FIG. 16B, Van Halen continue to play in the Dining Room and the Kitchen while the Living Room is switched to the TV source. In some instances, the user may subsequently speak commands to play the TV source in other zones in the home environment by grouping, as described above.

In related embodiments, the media playback system 100 may store state information indicating when the Living Room is connected to the TV source. When the Living Room is in this state, command criteria may dictate that voice commands related to the TV source may be implemented by the VAS, such as the source commands shown in FIG. 9B (e.g., enhance speech, turn on quiet mode, etc.).

Figure 17B:
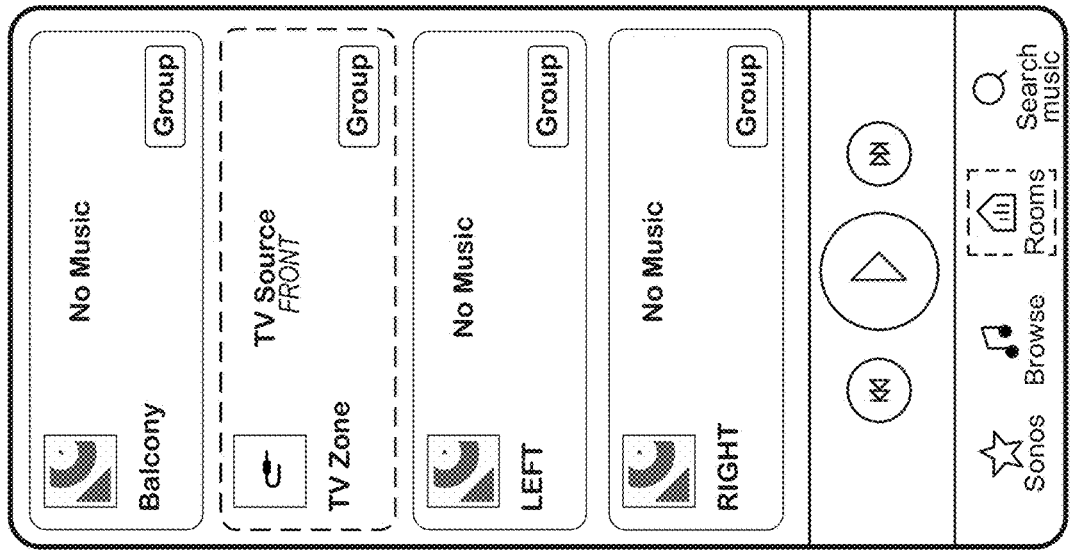
FIGS. 17A and 17B are diagrams showing example voice inputs for invoking a VAS in accordance with aspects of the disclosure.
Figure 17A:
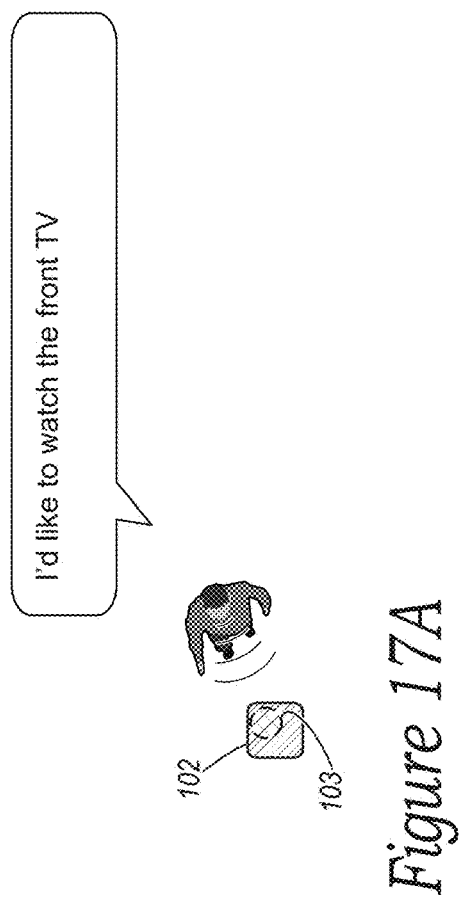

Command criteria may be configured to bond devices. For example, FIG. 17A shows a user speaking a voice input that says, "I'd like to watch the front TV." In response, the VAS 160 may determine based on the command criteria that the Front playback device 102*b* in FIG. 1 to separate it from the Living Room zoon and form a TV zone, as shown in FIG. 16B. In a related example, a user may speak the voice input directly to the NMD 103*b* of the Front playback device 102*b* to unbond this device. The remaining bonded devices in the living room, namely the Right, Left, and SUB devices 102*a*, 102*j*, and 102*k* may cease playing music. The control interface may also display these devices as no longer part of the Living Room zone.

Figure 18B:
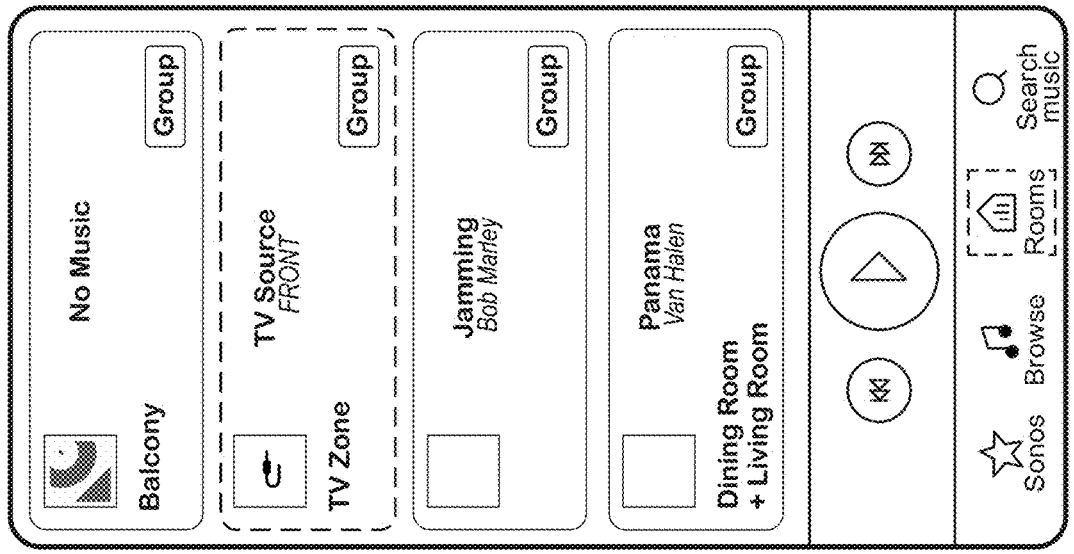
FIGS. 18A and 18B are diagrams showing example voice inputs for invoking a VAS in accordance with aspects of the disclosure.
Figure 18A:
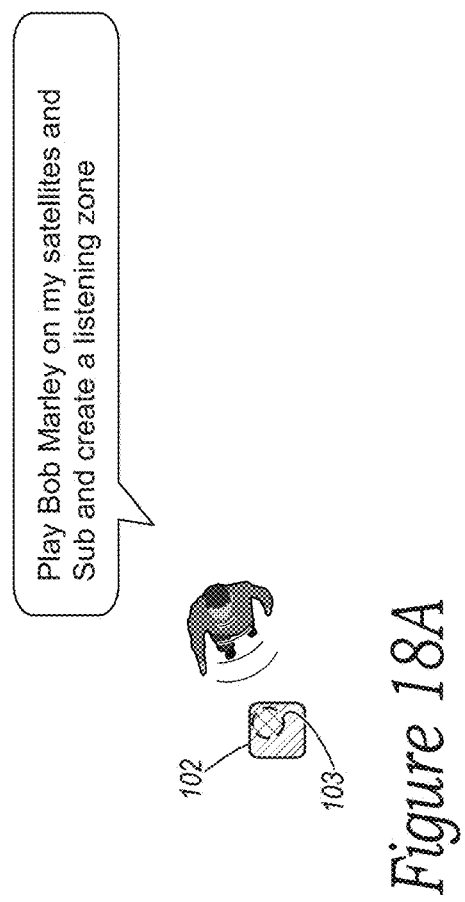

As another example of boding, a user may form a different bonded arrangement with the remaining devices in the living room area after separating the Front playback device 102*b*. For example, the user may form a listening zone, by speaking the voice input of "play Bob Marley on my satellites and sub and create a listening zone," as shown in FIGS. 18A and 18B. The term "satellites" may be a custom zone variable that refers to the Right playback device 102*a* and the Left playback device 102*k*. The voice input in FIG. 18A also initiates playback of Bob Marley in the newly formed listening zone. In the illustrated example, bonding operations in FIGS. 17A-18B did not interrupt playback of Van Halen in the Dining Room and Kitchen zones, as further shown in the controller interface of FIG. 18B.

Figure 19B:
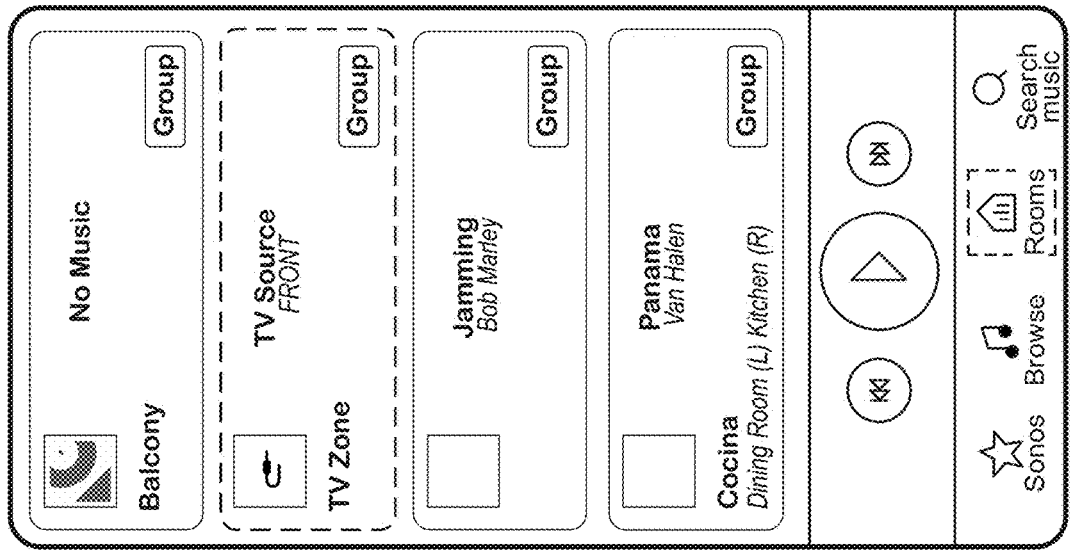
FIGS. 19A and 19B are diagrams showing example voice inputs for invoking a VAS in accordance with aspects of the disclosure.
Figure 19A:
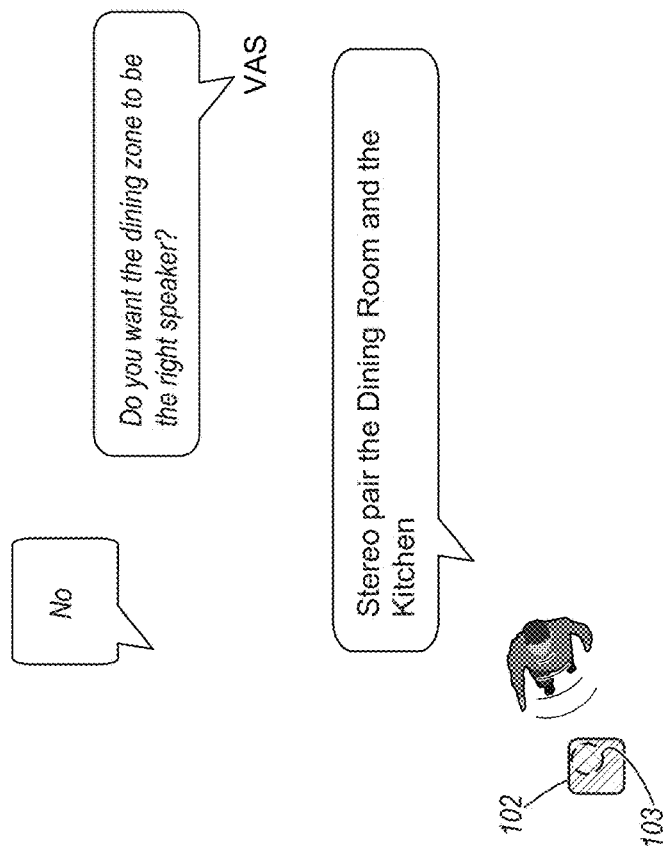

Command criteria may be configured to pair/bond devices. For example, FIG. 17A shows a multi-turn command in which the user speaks a voice input to "stereo-pair the Dining Room and the Kitchen." In this example, the VAS instructs one or more of the NMDs 103 to prompt the user and inquires whether the Dining Room zone is to be the left channel. If the user confirms the Dining Room as the right channel, the Kitchen zone will be the right channel. If the user indicates that the Dining Room is not to be the right channel, the Dining Room may default to being the left channel and the Kitchen zone will be the right channel. When bonded, one of the Dining Room and the Kitchen may be assigned as a group head. The VAS may prompt the user to designate a name for the bonded devices, including a unique name, such as "Cocina," as shown in FIG. 19B. The Cocina zone may resume playback of Van Halen, which may have been transferred from a playback queue of either of the former Dining Room and Kitchen zones.

Figure 20B:
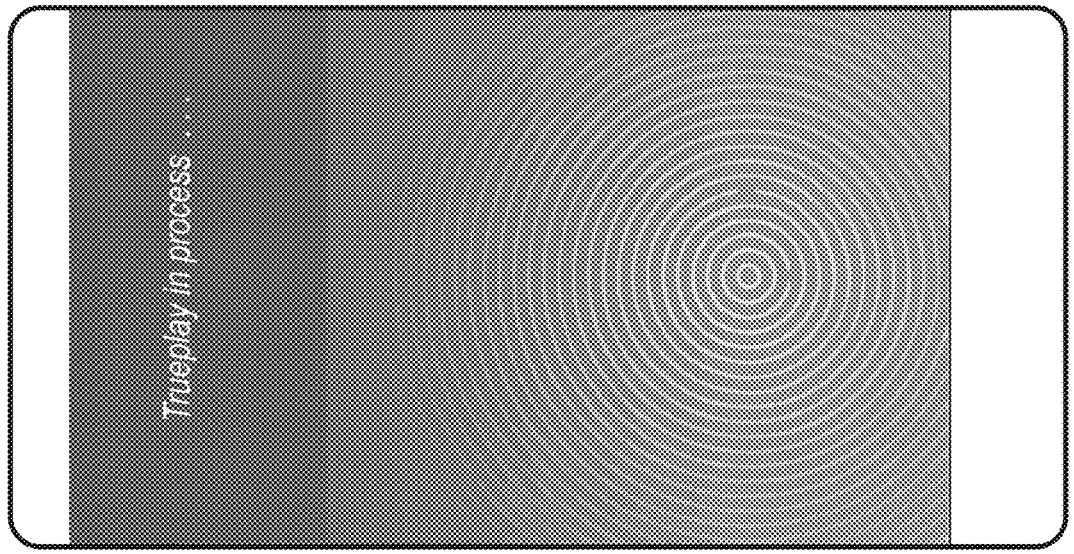
FIGS. 20A and 20B are diagrams showing example voice inputs for invoking a VAS in accordance with aspects of the disclosure.
Figure 20A:
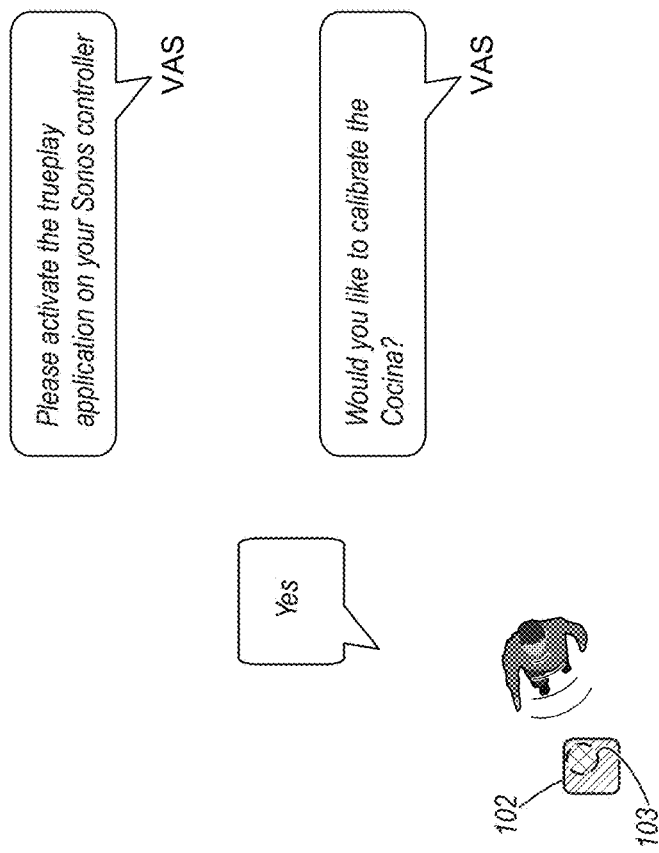

In related embodiments, bonding and merging devices can cause the VAS to initiate multi-turn or other commands for calibrating playback devices, as shown in FIGS. 20A and 20B. In one example, the VAS 160 may continue the multi-turn command sequence in FIG. 19A after pairing the Dining Room and Kitchen zones. In some embodiments, the command criteria may require that detection of the user operating one of the controller devices 103 before initiating calibration. In this way, the VAS 160 may ready calibration software, such as SONOS' TRUEPLAY® software for calibration, as shown in FIG. 20B.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method of invoking a first voice assistant service (VAS) for a media playback system, the method comprising: causing a set of command information comprising a listing of commands and associated command criteria to be stored in memory; capturing a voice input via at least one microphone of a network microphone device; detecting inclusion of one or more of the commands within the voice input; determining that the one or more commands meets corresponding command criteria within the set of command information; and in response to the determining, selecting the first (VAS) and foregoing selection of a second VAS, (ii) sending the voice input to the first VAS, (iii) after sending the voice input, receiving a response to the voice input from the first VAS.

(Feature 2) The method of feature 1, wherein he media playback system comprises a plurality of playback devices, and wherein the one or more commands includes a command to group two or more of the playback devices and initiate playback of audio content on a group comprising the two or more playback devices.

(Feature 3) The method of feature 2 wherein the determining comprises detecting inclusion of one or more keywords in the voice input, wherein the one or more keywords comprises at least one of (i) a first keyword associated with one of the two or more playback devices and a second keyword associated with another one of the two or more playback devices and (ii) the group comprising the two or more playback devices.

(Feature 4) The method of feature 2, wherein one of the two or more playback devices comprises the network microphone device.

(Feature 5) The method of feature 1, wherein the one or more commands are directed to the media playback system, and wherein the functions further comprise processing the one or more commands via the media playback system based on the response from the first VAS.

(Feature 6) The method of feature 5, wherein the one or more commands comprise at least one of a playback command and a transport control command.

(Feature 7) The method of feature 1, wherein the voice input is first voice input, and wherein the functions further comprise outputting an audible prompt based on the response from the first VAS.

(Feature 8) The method of feature 1, wherein the voice input is first voice input, and wherein the functions further comprise outputting an audible prompt for a second voice input based on the response from the first VAS.

(Feature 9) The method of feature 8, wherein the media playback system comprises a plurality of playback devices, wherein the one or more commands comprises a command to pair two or more of the playback devices, wherein the audible prompt comprises a request to assign at least one of the two or more of the playback devices to an audio channel, and wherein the second voice input includes a selection of at least one of the two or more of the playback devices.

(Feature 10) The method of feature 8 wherein the media playback system comprises one or more playback devices, and wherein the audible prompt comprises a request to calibrate equalization settings of one or more of the playback devices.

(Feature 11) The method of feature 1, wherein the determining comprises detecting a presence of a voice input source.

(Feature 12) The method of feature 11 wherein detecting the presence comprises detecting a direction at which the voice input is received by the network microphone device from the voice input source.

(Feature 13) The method of feature 11, wherein detecting the presence comprises detecting a distance between the network microphone device and the voice input source.

(Feature 14) The method of feature, wherein the determining comprises detecting use of a controller device.

(Feature 15) The method of feature 1, wherein the determining comprises detecting a voice profile of a voice input source.

(Feature 16) The method of feature 1, wherein the one or more commands are one or more first commands, and wherein the determining comprises detecting one or more second commands within the voice input.

(Feature 17) The method of feature 16, wherein the determining further comprises detecting at least one pause within the voice input between the one or more first commands and the one or more second commands.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A network microphone device (NMD) comprising:
a network interface;
at least one microphone;
at least one processor; and
at least one non-transitory computer-readable medium comprising program instructions that are executable by the at least one processor such that the NMD is configured to:
capture a first voice input via the at least one microphone;
detect, within the first voice input, at least one particular keyword corresponding to at least one specialized command;
when the at least one particular keyword corresponding to at least one specialized command is detected within the first voice input, select a first voice assistant for processing the first voice input, wherein the first voice assistant supports (a) additional specialized commands relative to a second voice assistant and (b) fewer non-specialized commands relative to the second voice assistant, wherein specialized commands supported by the first voice assistant comprise the at least one specialized command, and wherein the second voice assistant is not selected for processing voice inputs when the first voice assistant is selected;
send data representing at least a portion of the first voice input to the first voice assistant for processing;
capture a second voice input via the at least one microphone;
detect a wake word corresponding to the second voice assistant in the second voice input;
when the wake word corresponding to the second voice assistant is detected in the second voice input, select the second voice assistant for processing the second voice input, wherein the first voice assistant is not selected for processing voice inputs when the second voice assistant is selected; and
send data representing at least a portion of the second voice input to the second voice assistant for processing.

2. The NMD of claim 1, wherein the specialized commands are specialized to a particular type of device.

3. The NMD of claim 2, wherein the particular type of device is playback devices, and wherein the specialized commands comprise a grouping command to form a synchrony group among two or more playback devices.

4. The NMD of claim 3, wherein the specialized commands comprise a playback command to playback audio content from a particular streaming audio source that is not supported by the second voice assistant.

5. The NMD of claim 1, wherein the NMD comprises the second voice assistant, and wherein the at least one non-transitory computer-readable medium further comprises program instructions that are executable by the at least one processor such that the NMD is configured to:
determine an intent of the first voice input; and
perform a response according to the determined intent.

6. The NMD of claim 5, wherein one or more servers comprise the second voice assistant, and wherein the program instructions that are executable by the at least one processor such that the NMD is configured to send the data representing at least the portion of the second voice input to the second voice assistant for processing comprise program instructions that are executable by the at least one processor such that the NMD is configured to:
send, via the network interface over a wide area network, the data representing at least the portion of the second voice input to the one or more servers.

7. The NMD of claim 5, wherein the program instructions that are executable by the at least one processor such that the NMD is configured to perform the response according to the determined intent comprise program instructions that are executable by the at least one processor such that the NMD is configured to:
send, via the network interface over a local area network, at least one message to cause at least one device to carry out the at least one specialized command.

8. The NMD of claim 1, wherein the non-specialized commands comprise information queries, and wherein the information queries comprise weather queries.

9. The NMD of claim 1, wherein the at least one non-transitory computer-readable medium further comprises program instructions that are executable by the at least one processor such that the NMD is configured to:
detect a wake word corresponding to the first voice assistant in the first voice input.

10. The NMD of claim 9, wherein the wake word corresponding to the first voice assistant is different from the wake word corresponding to the second voice assistant.

11. At least one non-transitory computer-readable medium comprising program instructions that are executable by at least one processor such that a network microphone device (NMD) is configured to:
capture a first voice input via at least one microphone;
detect, within the first voice input, at least one particular keyword corresponding to at least one specialized command;

when the at least one particular keyword corresponding to at least one specialized command is detected within the first voice input, select a first voice assistant for processing the first voice input, wherein the first voice assistant supports (a) additional specialized commands relative to a second voice assistant and (b) fewer non-specialized commands relative to the second voice assistant, wherein specialized commands supported by the first voice assistant comprise the at least one specialized command, and wherein the second voice assistant is not selected for processing voice inputs when the first voice assistant is selected;

send data representing at least a portion of the first voice input to the first voice assistant for processing;

capture a second voice input via the at least one microphone;

detect a wake word corresponding to the second voice assistant in the second voice input;

when the wake word corresponding to the second voice assistant is detected in the second voice input, select the second voice assistant for processing the second voice input, wherein the first voice assistant is not selected for processing voice inputs when the second voice assistant is selected; and send data representing at least a portion of the second voice input to the second voice assistant for processing.

12. The at least one non-transitory computer-readable medium of claim 11,
wherein the specialized commands are specialized to a particular type of device.

13. The at least one non-transitory computer-readable medium of claim 12,
wherein the particular type of device is playback devices, and wherein the specialized commands comprise a grouping command to form a synchrony group among two or more playback devices.

14. The at least one non-transitory computer-readable medium of claim 13,
wherein the specialized commands comprise a playback command to playback audio content from a particular streaming audio source that is not supported by the second voice assistant.

15. The at least one non-transitory computer-readable medium of claim 11,
wherein the NMD comprises the second voice assistant, and wherein the at least one non-transitory computer-readable medium further comprises program instructions that are executable by the at least one processor such that the NMD is configured to:
determine an intent of the first voice input; and
perform a response according to the determined intent.

16. The at least one non-transitory computer-readable medium of claim 15, wherein one or more servers comprise the second voice assistant, and wherein the program instructions that are executable by the at least one processor such that the NMD is configured to send the data representing at least the portion of the second voice input to the second voice assistant for processing comprise program instructions that are executable by the at least one processor such that the NMD is configured to:
send, via a network interface over a wide area network, the data representing at least the portion of the second voice input to the one or more servers.

17. The at least one non-transitory computer-readable medium of claim 15, wherein the program instructions that are executable by the at least one processor such that the NMD is configured to perform the response according to the determined intent comprise program instructions that are executable by the at least one processor such that the NMD is configured to:
send, via a network interface over a local area network, at least one message to cause at least one device to carry out the at least one specialized command.

18. The at least one non-transitory computer-readable medium of claim 11, wherein the non-specialized commands comprise information queries, and wherein the information queries comprise weather queries.

19. The at least one non-transitory computer-readable medium of claim 11, wherein the at least one non-transitory computer-readable medium further comprises program instructions that are executable by the at least one processor such that the NMD is configured to:
detect a wake word corresponding to the first voice assistant in the first voice input.

20. A system comprising:
at least one smart device; and
a network microphone device (NMD) comprising:
a network interface;
at least one microphone;
at least one processor; and
at least one non-transitory computer-readable medium comprising program instructions that are executable by the at least one processor such that the NMD is configured to:
capture a first voice input via the at least one microphone;
detect, within the first voice input, at least one particular keyword corresponding to at least one specialized command;
when the at least one particular keyword corresponding to at least one specialized command is detected within the first voice input, select a first voice assistant for processing the first voice input, wherein the first voice assistant supports (a) additional specialized commands relative to a second voice assistant and (b) fewer non-specialized commands relative to the second voice assistant, wherein specialized commands supported by the first voice assistant comprise the at least one specialized command, and wherein the second voice assistant is not selected for processing voice inputs when the first voice assistant is selected;
determine, via the first voice assistant, an intent of the first voice input;
cause, via the network interface, the at least one smart device to carry out the at least one specialized command according to the determined intent;
capture a second voice input via the at least one microphone;
detect a wake word corresponding to the second voice assistant in the second voice input;
when the wake word corresponding to the second voice assistant is detected in the second voice input, select the second voice assistant for processing the second voice input, wherein the first voice assistant is not selected for processing voice inputs when the second voice assistant is selected; and
send data representing at least a portion of the second voice input to the second voice assistant for processing.

* * * * *